(12) United States Patent
Liu et al.

(10) Patent No.: US 12,486,370 B2
(45) Date of Patent: Dec. 2, 2025

(54) SOLVENT-RESISTANT SELF-CROSSLINKED POLY(ETHER IMIDE)S

(71) Applicant: VIRGINIA TECH INTELLECTUAL PROPERTIES, INC., Blacksburg, VA (US)

(72) Inventors: Guoliang Liu, Blacksburg, VA (US); Zhen Xu, Blacksburg, VA (US); Alan Roger Esker, Blacksburg, VA (US); Gehui Liu, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 197 days.

(21) Appl. No.: 18/549,998

(22) PCT Filed: Mar. 4, 2022

(86) PCT No.: PCT/US2022/070956
§ 371 (c)(1),
(2) Date: Sep. 11, 2023

(87) PCT Pub. No.: WO2022/198169
PCT Pub. Date: Sep. 22, 2022

(65) Prior Publication Data
US 2024/0239977 A1 Jul. 18, 2024

Related U.S. Application Data

(60) Provisional application No. 63/162,263, filed on Mar. 17, 2021.

(51) Int. Cl.
*C08J 5/18* (2006.01)
*B01D 53/22* (2006.01)
(Continued)

(52) U.S. Cl.
CPC .............. *C08J 5/18* (2013.01); *B01D 53/228* (2013.01); *B01D 67/009* (2013.01);
(Continued)

(58) Field of Classification Search
CPC . C08J 5/18; C08J 3/24; C08J 2379/08; C08G 73/1071; C08G 73/101;
(Continued)

(56) References Cited

U.S. PATENT DOCUMENTS

2004/0048978 A1* 3/2004 Okada ................. C08G 73/106
524/606
2010/0121022 A1 5/2010 Musa et al.
(Continued)

FOREIGN PATENT DOCUMENTS

CN 105289337 A * 2/2016
KR 2018088185 A * 8/2018 ......... C08G 73/1007
WO 2005/060444 A2 7/2005

OTHER PUBLICATIONS

International Search Report and Written Opinion for International Application No. PCT/US22/70956 mailed Jun. 27, 2022.

*Primary Examiner* — John D Freeman
(74) *Attorney, Agent, or Firm* — Thomas|Horstemeyer, LLP

(57) ABSTRACT

In one aspect, the disclosure relates to azide-containing poly(ether imide) polymers (PEIs; $N_3$-PEI-$N_3$) synthesized via a heterogenous diazotizationazidation reaction. In one aspect, the azide-containing PEIs can be solution-cast into films and then thermally crosslinked. In a further aspect, the crosslinked PEIs (X-PEIs) exhibit superior thermal and mechanical properties. In a still further aspect, X-PEIs display outstanding resistance to classical solvents for conventional PEI, including THF, DCM, chloroform, DMF, and NMP. In another aspect, with an initial number average molecular weight ($M_n$) of 8.9 kDa, the disclosed azide- (Continued)

containing PEIs have a high crosslinking density and thus possess desirable thermal, mechanical, and solvent resistance properties.

17 Claims, 20 Drawing Sheets

(51) Int. Cl.
  *B01D 67/00* (2006.01)
  *B01D 69/02* (2006.01)
  *B01D 71/64* (2006.01)
  *C08G 73/10* (2006.01)
  *C08J 3/24* (2006.01)

(52) U.S. Cl.
  CPC ......... *B01D 67/0093* (2013.01); *B01D 69/02* (2013.01); *B01D 71/643* (2022.08); *C08G 73/101* (2013.01); *C08G 73/1071* (2013.01); *C08J 3/24* (2013.01); *B01D 2323/081* (2022.08); *B01D 2323/30* (2013.01); *C08G 73/1025* (2013.01); *C08J 2379/08* (2013.01)

(58) Field of Classification Search
  CPC .. C08G 73/1025; B01D 53/228; B01D 69/02; B01D 2323/081; B01D 67/009; B01D 67/0093; B01D 2323/30; B01D 71/643
  See application file for complete search history.

(56) References Cited

U.S. PATENT DOCUMENTS

| | | |
|---|---|---|
| 2017/0037246 A1 | 2/2017 | Moniruzzaman |
| 2017/0252720 A1 | 9/2017 | Odeh et al. |

* cited by examiner

SOLVENT-RESISTANT SELF-CROSSLINKED POLY(ETHER IMIDE)S

CROSS REFERENCE TO RELATED APPLICATIONS

This application is the 35 U.S.C. § 371 National Stage application of PCT Application PCT/US2022/070956, filed on Mar. 4, 2022, which claims the benefit of U.S. Provisional Application No. 63/162,263, filed on Mar. 17, 2021, both of which are incorporated herein by reference in their entireties.

BACKGROUND

With excellent thermal properties, mechanical strength, and processability, poly(ether imide) (PEI) is a highly attractive engineering thermoplastic. Owing to the flexible linkages of ether and isopropylidene, PEI is usually melt-processed at ~340° C. in industry instead of ~400° C. as required by other high-performance polymers such as polyimide (PI) and poly(ether ketone) (PEEK). The low processing temperature reduces energy cost and minimizes polymer degradation, making it a favorable high-performance thermoplastic. PEI is also solution-processable in a few solvents including chloroform, N,N-dimethylformamide (DMF), tetrahydrofuran (THF), dichloromethane (DCM), and N-methyl pyrrolidone (NMP) due to its solubility within these solvents. As such, PEI has a critical drawback of low resistance to these solvents, i.e. PEIs can be significantly swollen or completely dissolved in these solvents. This drawback of low solvent-resistance impedes the use of PEI in some applications, such as coatings and filtration membranes involving organic solvents.

Thermal and mechanical properties often correlate with polymer chain length. Previously, end-groups such as ureidopyrimidinone, sulfonate salts, and phosphonium salt have effectively utilized quadrupole hydrogen bonding and ionic bonding to link together PEI chains after solution or melt-processing, endowing outstanding thermal and mechanical properties. However, the solvent resistance remains similar to pristine PEI because these linkages are noncovalent. To achieve solvent resistance, crosslinking with permanent covalent bonds is a promising approach. Ultraviolet light (UV) and thermal crosslinking are the two most common approaches. UV crosslinking, for instance, based on benzophenone unit, is convenient but time-consuming, inefficient, and often destructive to the polymer backbone. Because UV crosslinking initiates at surface layers due to strong light absorption by PEI, extended irradiation is necessary which causes polymer degradation. Thermal crosslinking, conversely, is more uniform and less destructive than UV crosslinking. Typical thermal crosslinkers such as acetylene, nitrile, amine, and carboxylic acid have been used in engineering plastics. However, the process is synthesis-demanding and costly, and the crosslinking chemistry is unreliable. For example, P84 polyimide crosslinked by diamine, albeit successfully industrialized under the tradenames of DURAMEM and PURAMEM (both from Evonik Industries, Essen, Germany), is susceptible to reversible decrosslinking at high temperatures and secondary pollution due to linker leaching.

Ideal crosslinkers should be efficient, safe, and clean. Azide is a promising candidate. Thermolysis of azides at moderate temperatures (<150° C.) produce nitrenes, aziridines, and dehydroazepine that are highly reactive with groups such as amine, azide, aryl, and alkyl in PEI. The challenge, however, is that azide-based small molecules and polyazides are potentially explosive.

Despite advances in poly(ether imide) (PEI) research, there is still a scarcity of PEI polymers that simultaneously possess desirable thermal properties, mechanical properties, and solvent resistance. An ideal crosslinked PEI polymer would avoid the risk of explosion associated with azide-based small molecules and polyazides. The ideal polymer would also not be susceptible to linker leaching and any associated decrosslinking, such as is known to occur with thermal crosslinking, and would not require extended irradiation as with UV crosslinking. These needs and other needs are satisfied by the present disclosure.

SUMMARY

In accordance with the purpose(s) of the present disclosure, as embodied and broadly described herein, the disclosure, in one aspect, relates to azide-containing poly(ether imide) polymers (PEIs; $N_3$-PEI-$N_3$) synthesized via a heterogeneous diazotizationazidation reaction. In one aspect, the azide-containing PEIs can be solution-cast into films and then thermally crosslinked. In a further aspect, the crosslinked PEIs (X-PEIs) exhibit superior thermal and mechanical properties. In a still further aspect, X-PEIs display outstanding resistance to classical solvents for conventional PEI, including THF, DCM, chloroform, DMF, and NMP. In another aspect, with an initial number average molecular weight ($M_n$) of 8.9 kDa, the disclosed azide-containing PEIs have a high crosslinking density and thus possess desirable thermal, mechanical, and solvent resistance properties.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1A:
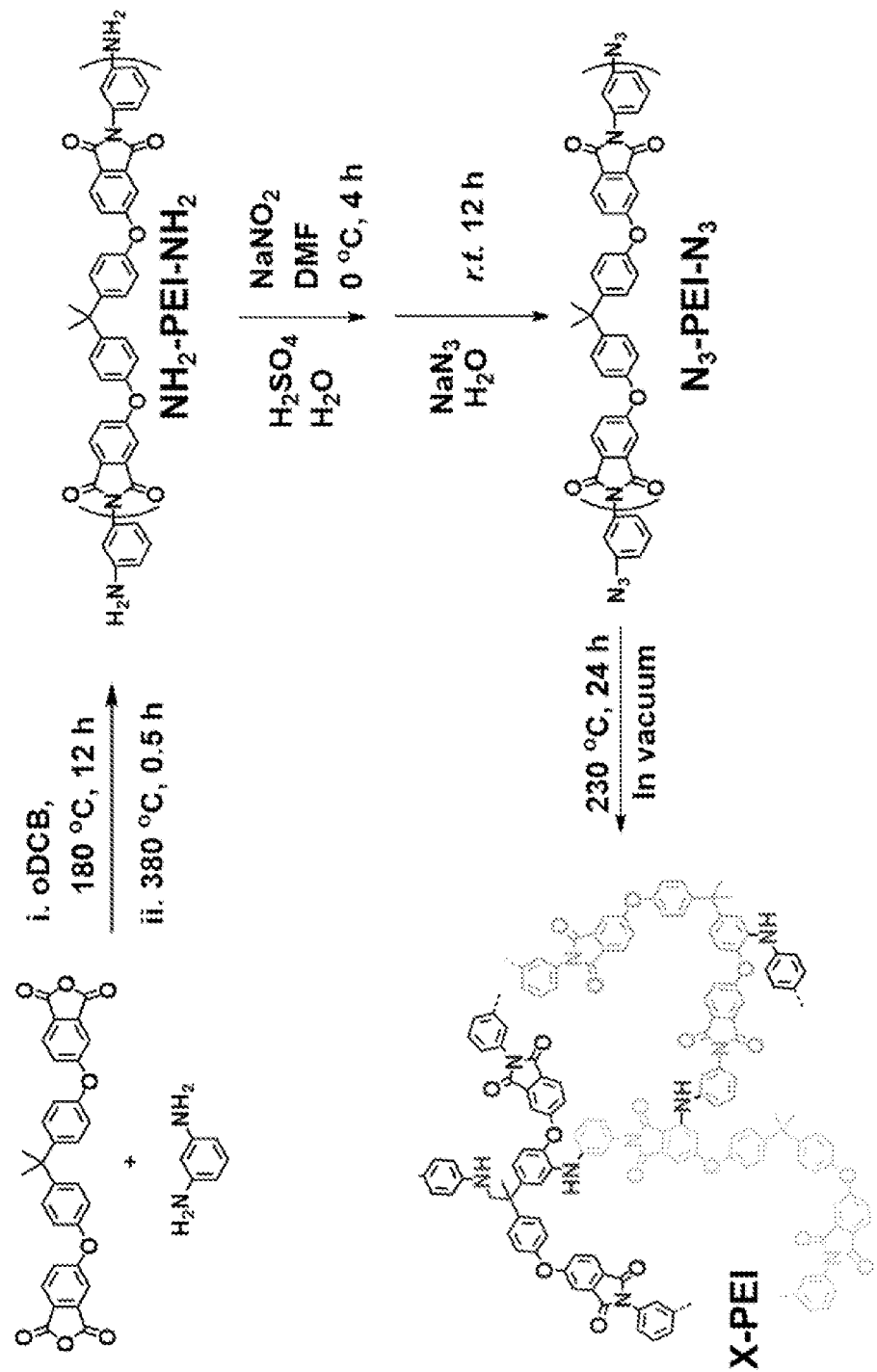
FIG. 1A shows synthesis and preparation of $N_3$-PEI-$N_3$ and X-PEI and FIG. 1B shows photographic images of the synthesized materials.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Disclosed herein are azide-containing PEIs ($N_3$-PEI-$N_3$) synthesized via a heterogenous diazotizationazidation reaction. In one aspect, the azide-containing PEIs can be solution-cast into films and then thermally crosslinked. In a further aspect, the crosslinked PEIs (X-PEIs) exhibit superior thermal and mechanical properties. In a still further aspect, X-PEIs display outstanding resistance to classical solvents for conventional PEI, including THF, DCM, chloroform, DMF, and NMP. In another aspect, with an initial number average molecular weight ($M_n$) of 8.9 kDa, the disclosed azide-containing PEIs have a high crosslinking density and thus possess desirable thermal, mechanical, and solvent resistance properties.

In one aspect, disclosed herein is a method for making an azide-containing poly(ether imide) polymer, the method including at least the following steps:
(a) admixing an amine-terminated poly(ether imide) with an acid to form a first admixture;
(b) admixing the first admixture with a reducing agent to form a second admixture; and
(c) admixing the second admixture with an azide salt to form the azide-containing poly(ether imide) polymer.

In one aspect, the acid can be sulfuric acid. In another aspect, the first admixture can be stirred for about 30 minutes. In another aspect, the first admixture can be stirred at about 0° C.

In another aspect, the reducing agent can be $NaNO_2$. In another aspect, the second admixture can be stirred for about 4 hours. In another aspect, the second admixture can be stirred at about 0° C.

In still another aspect, the azide salt can be $NaN_3$. Further in this aspect, step (c) can be conducted at room temperature for about 12 hours.

In another aspect, disclosed herein is a method for making a crosslinked poly(ether imide) polymeric film, the method including the steps of:
(a) casting an azide-containing poly(ether imide) polymer into a film; and
(b) heating the polymer to a crosslinking temperature to crosslink the polymer.

In another aspect, in the disclosed method, the film can be cast from a solution or a melt. In a further aspect, the polymer can be dissolved in a solvent such as, for example, dichloromethane, trichloromethane, bromomethane, N,N-dimethylformamide, dimethylacetamide, N-methyl-2-pyrrolidone, dimethyl sulfoxide, chlorobenzenes, water, methanol, ethanol, acetic acid, or any combination thereof prior to casting from a solution. In some aspects, when the solvent is water, the water has a pH of less than about 11. In still another aspect, polymer can be cast into a dish such as, for example, a PTFE dish. In one aspect, the heating can be accomplished in a vacuum oven. In a further aspect, heating the polymer further includes annealing, exposure to radiation, or both annealing and exposure to radiation. In one aspect, the radiation can be infrared (IR) radiation, microwave radiation, radio frequency (RF) radiation, ultraviolet (UV) radiation, or any combination thereof. In any of these aspects, the crosslinking temperature can be from about 150° C. to about 300° C., or from about 200° C. to about 300° C., or can be about 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or about 300° C., or a combination of any of the foregoing values, or a range encompassing any of the foregoing values.

In one aspect, heating the polymer includes gradually raising the temperature of the polymer from a first temperature to the crosslinking temperature. In a further aspect, the polymer can be held at the crosslinking temperature for a period of time. In one aspect, the period of time is about 24 hours.

Also disclosed are crosslinked polymeric films produced by the disclosed methods.

In any of these aspects, the azide-containing poly(ether imide) polymer has a structure of Formula I:

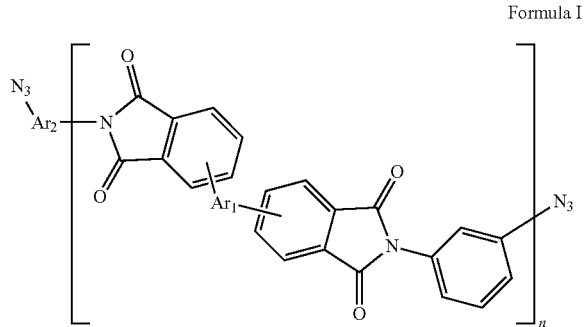

Formula I wherein n is from 5 to 100; and
wherein $Ar_1$ and $Ar_2$ independently are substituted or unsubstituted aromatic or diaromatic groups.

In one aspect, $Ar_1$ can be:

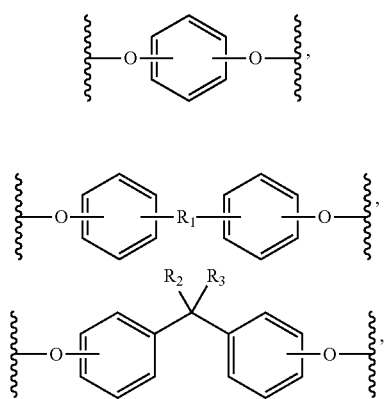

or any combination thereof;
wherein $R_1$ is selected from phenylene, O, C(=O)O, S(=O)$_2$, C(=O)O$_2$, C(=O), $C_xH_{2x}$, or any combination thereof;
wherein x is from 0 to 5; and
wherein $R_2$ and $R_3$ are independently selected from trifluoromethyl, trichloromethyl, tribromomethyl, hydroxyl, thiol, fluoro, chloro, bromo, hydrogen, $C_1$-$C_5$ alkyl, or any combination thereof.

In another aspect, $Ar_2$ can be:

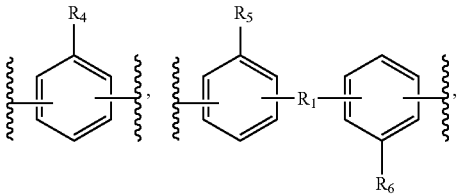

or any combination thereof;
wherein $R_1$ is selected from phenylene, O, C(=O)O, S(=O)$_2$, C(=O)O$_2$, C(=O), $C_xH_{2x}$, or any combination thereof;
wherein x is from 0 to 5;
wherein $R_4$, $R_5$, and $R_6$ are independently selected from hydrogen, nitro, fluoro, chloro, bromo, $C_yH_{2y+1}$, or any combination thereof; and
wherein y is from 1 to 5.

In an aspect, the azide-containing poly(ether imide) polymer has a structure of Formula II:

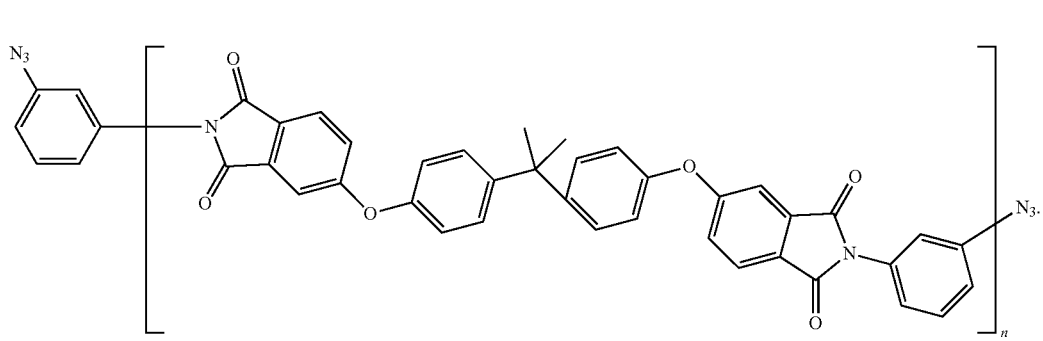

Formula II

In one aspect, disclosed herein is a crosslinked poly(ether imide) polymeric film containing a plurality of polymeric units of Formula III:

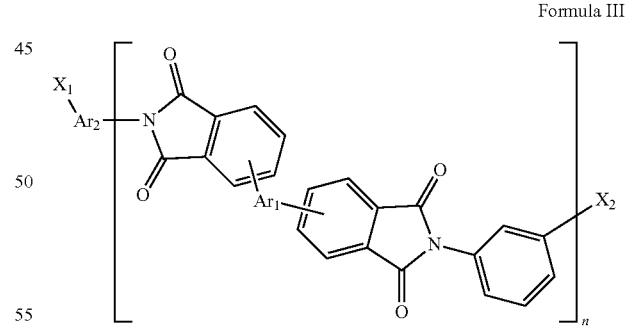

Formula III wherein n represents a number of monomeric units in each polymeric unit;
wherein n is from 5 to 100;
wherein $Ar_1$ and $Ar_2$ independently comprise substituted or unsubstituted aromatic or diaromatic groups as defined above; and
wherein at least one implicit hydrogen of at least one monomeric unit of each polymeric unit of the plurality comprises an amine linkage to at least one of $X_1$ or $X_2$ of at least one other polymeric unit of the plurality.

In still another aspect, the polymeric film contains a plurality of polymeric units of Formula IV:

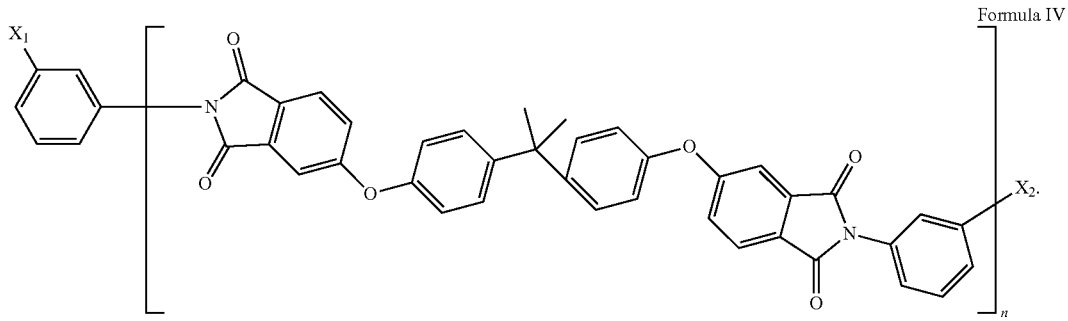

Formula IV

In any of these aspects, n can be from about 5 to about 100, or from about 5 to about 90, or from about 10 to about 30, or from about 12 to 26, or can be 5, 10, 15, 20, 25, 30, 35, 40, 45, 50, 55, 60, 65, 70, 75, 80, 85, 90, 95, or about 100, or a combination of any of the foregoing values, or a range encompassing any of the foregoing values.

In another aspect, the polymer can have a molecular weight of from about 2 to about 50 kDa, or from about 5 to about 20 kDa, or from about 7 to about 16 kDa, or of about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50 kDa, or a combination of any of the foregoing values, or a range encompassing any of the foregoing values.

In one aspect, the polymer is amorphous. In another aspect, the polymer can be crystalline or semicrystalline. In a further aspect, it is understood that the amorphous, crystalline, or semicrystalline nature of the polymer is determined based on the variable groups and substituents in the polymer structure. In a further aspect, differential scanning calorimetry (DSC) or dynamic mechanical analysis (DMA) can be used to determine degree of crystallinity of the polymer and its respective melting, softening, and glass transition temperatures ($T_g$).

In a further aspect, the polymers and polymeric films are not explosive. In another aspect, the crosslinked polymeric film does not reversibly decrosslink at elevated temperatures.

In one aspect, the crosslinked polymeric film has a glass transition temperature ($T_g$) of from about 150 to about 250° C., or from about 200 to about 250° C., or of about 150, 155, 160, 165, 170, 175, 180, 185, 190, 195, 200, 205, 210, 215, 220, 225, 230, 235, 240, 245, or about 250, or a combination of any of the foregoing values, or a range encompassing any of the foregoing values.

In another aspect, the crosslinked polymeric film has a thermal decomposition temperature ($T_d$) of from about 500 to about 600° C., or from about 530 to about 560° C., or of about 500, 505, 510, 515, 520, 525, 530, 535, 540, 545, 550, 555, 560, 565, 570, 575, 580, 585, 590, 595, or about 600° C., or a combination of any of the foregoing values, or a range encompassing any of the foregoing values.

In one aspect, the disclosed crosslinked polymeric films have a storage modulus at 100° C. and 1 Hz of from about 1.25 to about 1.8 GPa, or of about 1.25, 1.3, 1.35, 1.4, 1.45, 1.5, 1.55, 1.6, 1.65, 1.7, 1.75, or about 1.8 GPa, or a combination of any of the foregoing values, or a range encompassing any of the foregoing values.

In another aspect, the disclosed crosslinked polymeric film has an equilibrium modulus at 300° C. and 1 Hz of from about 1.2 to about 2.35 MPa, or of about 1.2, 1.25, 1.3, 1.35, 1.4, 1.45, 1.5, 1.55, 1.6, 1.65, 1.7, 1.75, 1.8, 1.85, 1.9, 1.95, 2, 2.05, 2.1, 2.15, 2.2, 2.25, 2.3, or about 2.35 MPa, or a combination of any of the foregoing values, or a range encompassing any of the foregoing values.

In still another aspect, the crosslinked polymeric film can have a crosslinking density of from about 0.09 to about 0.18 kmol/m$^3$, or of about 0.09, 0.1, 0.11, 0.12, 0.13, 0.14, 0.15, 0.16, 0.17, or about 0.18 kmol/m$^3$, or a combination of any of the foregoing values, or a range encompassing any of the foregoing values.

In one aspect, the disclosed crosslinked polymeric film has a tensile stress of from about 80 to about 120 MPa, or from about 97 to about 102 MPa at room temperature using a strain rate of 5 mm/min, or of about 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or about 120 MPa, or a combination of any of the foregoing values, or a range encompassing any of the foregoing values.

In another aspect, the disclosed crosslinked polymeric film has a tensile strain of from about 1 to about 5.1%, or from about 4.8 to about 5.1% at room temperature using a strain rate of 5 mm/min, or of about 1, 1.5, 2, 2.5, 3, 3.5, 4, 4.5, 5, or about 5.1%, or a combination of any of the foregoing values, or a range encompassing any of the foregoing values.

In still another aspect, the disclosed crosslinked polymeric film has a Young's modulus of from about 2 to about 4 GPa, or from about 3.2 to about 3.4 GPa at room temperature using a strain rate of 5 mm/min, or of about 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, or about 4 GPa, or a combination of any of the foregoing values, or a range encompassing any of the foregoing values.

In one aspect, the crosslinked polymeric film is resistant to dissolution in at least one solvent. In another aspect, the crosslinked polymeric film does not dissolve in the at least one solvent. In still another aspect, the crosslinked polymeric film does not swell in the at least one solvent. In one aspect, the at least one solvent can be dichloromethane, trichloromethane, bromomethane, N,N-dimethylformamide, dimethylacetamide, N-methyl-2-pyrrolidone, dimethyl sulfoxide, chlorobenzenes, water, methanol, ethanol, acetic acid, or any combination thereof. In one aspect, when the solvent is or includes water, the water can have a pH of less than 11.

Also disclosed herein are articles including the disclosed crosslinked polymeric films. In one aspect, the article can be a coating, a film, a filtration membrane, a battery separator, a fuel cell membrane, a gas separation membrane, or any combination thereof.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

DEFINITIONS

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a monomeric unit," "a film," or "an amine linkage," includes, but is not limited to, mixtures or combinations of two or more such monomeric units, films, or amine linkages, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

As used herein, "resistant to dissolution in at least one solvent" and "solvent-resistant" mean that a polymeric film as disclosed herein does not disintegrate, dissolve, or otherwise break down in contact with or immersed in the at least one solvent. In some aspects, the films do not swell significantly in contact with or immersed in the at least one solvent.

As used herein, "implicit hydrogens" or "implicit hydrogen atoms" refers to hydrogen atoms understood to be present in a molecule or polymer represented by a chemical structure, without being directly shown. Examples of structures having implicit hydrogens are shown below:

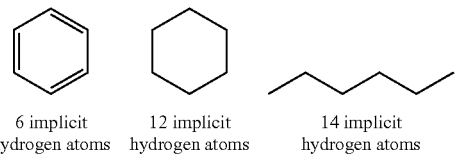

6 implicit hydrogen atoms     12 implicit hydrogen atoms     14 implicit hydrogen atoms A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. It is also contemplated that, in certain aspects, unless expressly indicated to the contrary, individual substituents can be further optionally substituted (i.e., further substituted or unsubstituted).

In defining various terms, "A$^1$," "A$^2$," "A$^3$," and "A$^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" or "aliphatic group," as used herein, denotes a hydrocarbon moiety that may be straight-chain (i.e., unbranched), branched, or cyclic (including fused, bridging, and spirofused polycyclic) and may be completely saturated or may contain one or more units of unsaturation, but which is not aromatic. Unless otherwise specified, aliphatic groups contain 1-20 carbon atoms. Aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. The term alkyl group can also be a C1 alkyl, C1-C2 alkyl, C1-C3 alkyl, C1-C4 alkyl, C1-C5 alkyl, C1-C6 alkyl, C1-C7 alkyl, C1-C8 alkyl, C1-C9 alkyl, C1-C10 alkyl, and the like up to and including a C1-C24 alkyl.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. Alternatively, the term "monohaloalkyl" specifically refers to an alkyl group that is substituted with a single halide, e.g. fluorine, chlorine, bromine, or iodine. The term "polyhaloalkyl" specifically refers to an alkyl group that is independently substituted with two or more halides, i.e. each halide substituent need not be the same halide as another halide substituent, nor do the multiple instances of a halide substituent need to be on the same carbon. The term "alkoxyalkyl" specifically refers to an alkyl group that is substituted with one or more alkoxy groups, as described below. The term "aminoalkyl" specifically refers to an alkyl group that is substituted with one or more amino groups. The term "hydroxyalkyl" specifically refers to an alkyl group that is substituted with one or more hydroxy groups. When "alkyl" is used in one instance and a specific term such as "hydroxyalkyl" is used in another, it is not meant to imply that the term "alkyl" does not also refer to specific terms such as "hydroxyalkyl" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, cycloalkyl, alkoxy, amino, ether, halide, hydroxy, nitro, silyl, sulfo-oxo, or thiol as described herein.

The term "alkanediyl" as used herein, refers to a divalent saturated aliphatic group, with one or two saturated carbon atom(s) as the point(s) of attachment, a linear or branched, cyclo, cyclic or acyclic structure, no carbon-carbon double or triple bonds, and no atoms other than carbon and hydrogen. The groups, —CH$_2$-(methylene), —CH$_2$CH$_2$—, —CH$_2$C(CH$_3$)$_2$CH$_2$—, and —CH$_2$CH$_2$CH$_2$— are non-limiting examples of alkanediyl groups.

The terms "alkoxy" and "alkoxyl" as used herein to refer to an alkyl or cycloalkyl group bonded through an ether linkage; that is, an "alkoxy" group can be defined as —OA$^1$ where A$^1$ is alkyl or cycloalkyl as defined above. "Alkoxy" also includes polymers of alkoxy groups as just described; that is, an alkoxy can be a polyether such as —OA$^1$-OA$^2$ or -OA$^1$-(OA$^2$)$_a$-OA$^3$, where "a" is an integer of from 1 to 200 and A$^1$, A$^2$, and A$^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as (A$^1$A$^2$)C=C(A$^3$A$^4$) are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "aromatic group" as used herein refers to a ring structure having cyclic clouds of delocalized π electrons above and below the plane of the molecule, where the π clouds contain (4n+2) π electrons. A further discussion of aromaticity is found in Morrison and Boyd, Organic Chemistry, (5th Ed., 1987), Chapter 13, entitled "Aromaticity," pages 477-497, incorporated herein by reference. The term "aromatic group" is inclusive of both aryl and heteroaryl groups.

The term "aryl" as used herein is a group that contains any carbon-based aromatic group including, but not limited to, benzene, naphthalene, phenyl, biphenyl, anthracene, and the like. The aryl group can be substituted or unsubstituted. The aryl group can be substituted with one or more groups including, but not limited to, alkyl, cycloalkyl, alkoxy, alkenyl, cycloalkenyl, alkynyl, cycloalkynyl, aryl, heteroaryl, aldehyde, —NH$_2$, carboxylic acid, ester, ether, halide, hydroxy, ketone, azide, nitro, silyl, sulfo-oxo, or thiol as described herein. The term "biaryl" is a specific type of aryl group and is included in the definition of "aryl." In addition, the aryl group can be a single ring structure or comprise multiple ring structures that are either fused ring structures or attached via one or more bridging groups such as a carbon-carbon bond. For example, biaryl to two aryl groups that are bound together via a fused ring structure, as in naphthalene, or are attached via one or more carbon-carbon bonds, as in biphenyl.

The term "aldehyde" as used herein is represented by the formula —C(O)H. Throughout this specification "C(O)" is a short hand notation for a carbonyl group, i.e., C=O.

The terms "amine" or "amino" as used herein are represented by the formula —NA$^1$A$^2$, where A$^1$ and A$^2$ can be, independently, hydrogen or alkyl, cycloalkyl, alkenyl, cycloalkenyl, alkynyl, cycloalkynyl, aryl, or heteroaryl group as described herein. A specific example of amino is —NH$_2$.

The term "alkylamino" as used herein is represented by the formula —NH(-alkyl) and —N(-alkyl)$_2$, where alkyl is a described herein. Representative examples include, but are not limited to, methylamino group, ethylamino group, propylamino group, isopropylamino group, butylamino group, isobutylamino group, (see-butyl)amino group, (tert-butyl) amino group, pentylamino group, isopentylamino group, (tert-pentyl)amino group, hexylamino group, dimethylamino group, diethylamino group, dipropylamino group, diisopropylamino group, dibutylamino group, diisobutylamino group, di(see-butyl)amino group, di(tert-butyl) amino group, dipentylamino group, diisopentylamino group, di(tert-pentyl)amino group, dihexylamino group, N-ethyl-N-methylamino group, N-methyl-N-propylamino group, N-ethyl-N-propylamino group and the like.

The term "carboxylic acid" as used herein is represented by the formula —C(O)OH.

The term "ester" as used herein is represented by the formula —OC(O)A$^1$ or —C(O)OA$^1$, where A$^1$ can be alkyl, cycloalkyl, alkenyl, cycloalkenyl, alkynyl, cycloalkynyl, aryl, or heteroaryl group as described herein. The term "polyester" as used herein is represented by the formula -(A$^1$O(O)C-A$^2$-C(O)O)$_a$— or -(A$^1$O(O)C-A$^2$-OC(O))$_a$—, where A$^1$ and A$^2$ can be, independently, an alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "ether" as used herein is represented by the formula A$^1$OA$^2$, where A$^1$ and A$^2$ can be, independently, an alkyl, cycloalkyl, alkenyl, cycloalkenyl, alkynyl, cycloalkynyl, aryl, or heteroaryl group described herein. The term "polyether" as used herein is represented by the formula -(A$^1$O-A$^2$O)$_a$—, where A$^1$ and A$^2$ can be, independently, an alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The terms "halo," "halogen" or "halide," as used herein can be used interchangeably and refer to F, Cl, Br, or I.

The term "hydroxyl" or "hydroxy" as used herein is represented by the formula —OH.

The term "ketone" as used herein is represented by the formula A$^1$C(O)A$^2$, where A$^1$ and A$^2$ can be, independently, an alkyl, cycloalkyl, alkenyl, cycloalkenyl, alkynyl, cycloalkynyl, aryl, or heteroaryl group as described herein.

The term "azide" or "azido" as used herein is represented by the formula —N$_3$.

The term "nitro" as used herein is represented by the formula —NO$_2$.

The term "nitrile" or "cyano" as used herein is represented by the formula —CN.

"R$^1$," "R$^2$," "R$^3$," . . . "R$^n$," where n is an integer, as used herein can, independently, possess one or more of the groups listed above. For example, if R$^1$ is a straight chain alkyl group, one of the hydrogen atoms of the alkyl group can optionally be substituted with a hydroxyl group, an alkoxy group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. In is also contemplated that, in certain aspects, unless expressly indicated to the contrary, individual substituents can be further optionally substituted (i.e., further substituted or unsubstituted).

Suitable monovalent substituents on a substitutable carbon atom of an "optionally substituted" group are independently halogen; —(CH$_2$)$_{0-4}$R$^o$; —(CH$_2$)$_{0-4}$R$^o$; —O(CH$_2$)$_{0-4}$R$^o$, —O—(CH$_2$)$_{0-4}$C(O)OR$^o$; —(CH$_2$)$_{0-4}$CH(OR$^o$)$_2$; —(CH$_2$)$_{0-4}$SR$^o$; —(CH$_2$)$_{0-4}$Ph, which may be substituted with R$^o$; —(CH$_2$)$_{0-4}$O(CH$_2$)$_{0-1}$Ph which may be substituted with R$^o$; —CH=CHPh, which may be substituted with R$^o$; —(CH$_2$)$_{0-4}$O(CH$_2$)$_{0-1}$-pyridyl which may be substituted with R$^o$; —NO$_2$; —CN; —N$_3$; —(CH$_2$)$_{0-4}$N(R$^o$)$_2$; —(CH$_2$)$_{0-4}$N(R$^o$)C(O)R$^o$; —N(R$^o$)C(S)R$^o$; —(CH$_2$)$_{0-4}$N(R$^o$)C(O)NR$^o$$_2$; —N(R$^o$)C(S)NR$^o$$_2$; —(CH$_2$)$_{0-4}$N(R$^o$)C(O)OR$^o$; —N(R$^o$)N(R$^o$)C(O)R$^o$; —N(R$^o$)N(R$^o$)C(O)NR$^o$$_2$; —N(R$^o$)N(R$^o$)C(O)OR$^o$; —(CH$_2$)$_{0-4}$C(O)R$^o$; —C(S)R$^o$; —(CH$_2$)$_{0-4}$C(O)OR$^o$; —(CH$_2$)$_{0-4}$C(O)SR$^o$; —(CH$_2$)$_{0-4}$C(O)OSiR$^o$$_3$; —(CH$_2$)$_{0-4}$OC(O)R$^o$; —OC(O)(CH$_2$)$_{0-4}$SR—, SC(S)SR$^o$; —(CH$_2$)$_{0-4}$SC(O)R$^o$; —(CH$_2$)$_{0-4}$C(O)NR$^o$$_2$; —C(S)NR$^o$$_2$; —C(S)SR$^o$; —(CH$_2$)$_{0-4}$OC(O)NR$^o$$_2$; —C(O)N(OR$^o$)R$^o$; —C(O)C(O)R$^o$; —C(O)CH$_2$C(O)R$^o$; —C(NOR$^o$)R$^o$; —(CH$_2$)$_{0-4}$SSR$^o$; —(CH$_2$)$_{0-4}$S(O)$_2$R$^o$; —(CH$_2$)$_{0-4}$S(O)$_2$OR$^o$; —(CH$_2$)$_{0-4}$OS(O)$_2$R$^o$; —S(O)$_2$NR$^o$$_2$; —(CH$_2$)$_{0-4}$S(O)R$^o$; —N(R$^o$)S(O)$_2$NR$^o$$_2$; —N(R$^o$)S(O)$_2$R$^o$; —N(OR$^o$)R$^o$; —C(NH)NR$^o$$_2$; —P(O)$_2$R$^o$; —P(O)R$^o$$_2$; —OP(O)R$^o$$_2$; —OP(O)(OR$^o$)$_2$; SiR$^o$$_3$; —(C$_{1-4}$ straight or branched alkylene)O—N(R$^o$)$_2$; or —(C$_{1-4}$ straight or branched alkylene)C(O)O—N(R$^o$)$_2$, wherein each R$^o$ may be substituted as defined below and is independently hydrogen, C$_{1-6}$ aliphatic, —CH$_2$Ph, —O(CH$_2$)$_{0-1}$Ph, —CH$_2$-(5-6 membered heteroaryl ring), or a 5-6-membered saturated, partially unsaturated, or aryl ring having 0-4 heteroatoms independently selected from nitrogen, oxygen, or sulfur, or, notwithstanding the definition above, two independent occurrences of R$^o$, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on R$^o$ (or the ring formed by taking two independent occurrences of R$^o$ together with their intervening atoms), are independently halogen, —(CH$_2$)$_{0-2}$R$^•$, -(haloR$^•$), —(CH$_2$)$_{0-2}$OH, —(CH$_2$)$_{0-2}$OR$^•$, —(CH$_2$)$_{0-2}$CH(OR$^•$)$_2$; —O(haloR$^•$), —CN, —N$_3$, —(CH$_2$)$_{0-2}$C(O)R$^•$, —(CH$_2$)$_{0-2}$C(O)OH, —(CH$_2$)$_{0-2}$C(O)OR$^•$, —(CH$_2$)$_{0-2}$SR$^•$, —(CH$_2$)$_{0-2}$SH, —(CH$_2$)$_{0-2}$NH$_2$, —(CH$_2$)$_{0-2}$NHR$^•$, —(CH$_2$)$_{0-2}$NR$^•$$_2$, —NO$_2$, —SiR$^•$$_3$, —OSiR$^•$$_3$, —C(O)SR$^•$, —(C$_{1-4}$ straight or branched alkylene)C(O)OR$^•$, or —SSR$^•$ wherein each R$^•$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R$^o$ include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R˙, -(haloR˙), —OH, —OR˙, —O(haloR˙), —CN, —C(O)OH, —C(O)OR˙, —NH$_2$, —NHR˙, —NR˙$_2$, or —NO$_2$, wherein each R˙ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R\, —NR\$_2$, —C(O)R\, —C(O)OR\, —C(O)C(O)R\, —C(O)CH$_2$C(O)R\, —S(O)$_2$R\, —S(O)$_2$NR\$_2$, —C(S)NR\$_2$, —C(NH)NR\$_2$, or —N(R\)S(O)$_2$R\; wherein each R\ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R\, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R\ are independently halogen, —R˙, -(haloR˙), —OH, —OR˙, —O(haloR˙), —CN, —C(O)OH, —C(O)OR˙, —NH$_2$, —NHR˙, —NR˙$_2$, or —NO$_2$, wherein each R˙ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-thiazolidinedione radical in a particular compound has the structure:

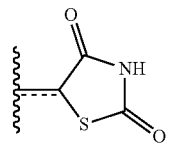

regardless of whether thiazolidinedione is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5, 6, 7, 8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

Many organic compounds exist in optically active forms having the ability to rotate the plane of plane-polarized light. In describing an optically active compound, the prefixes D and L or R and S are used to denote the absolute configuration of the molecule about its chiral center(s). The prefixes d and l or (+) and (−) are employed to designate the sign of rotation of plane-polarized light by the compound, with (−) or meaning that the compound is levorotatory. A compound prefixed with (+) or d is dextrorotatory. For a given chemical structure, these compounds, called stereoisomers, are identical except that they are non-superimposable mirror images of one another. A specific stereoisomer can also be referred to as an enantiomer, and a mixture of such isomers is often called an enantiomeric mixture. A 50:50 mixture of enantiomers is referred to as a racemic mixture. Many of the compounds described herein can have one or more chiral centers and therefore can exist in different enantiomeric forms. If desired, a chiral carbon can be designated with an asterisk (*). When bonds to the chiral carbon are depicted as straight lines in the disclosed formulas, it is understood that both the (R) and (S) configurations of the chiral carbon, and hence both enantiomers and mixtures thereof, are embraced within the formula. As is used in the art, when it is desired to specify the absolute configuration about a chiral carbon, one of the bonds to the chiral carbon can be depicted as a wedge (bonds to atoms above the plane) and the other can be depicted as a series or wedge of short parallel lines is (bonds to atoms below the plane). The Cahn-Ingold-Prelog system can be used to assign the (R) or (S) configuration to a chiral carbon.

In some aspects, a structure of a compound can be represented by a formula:

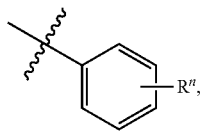

which is understood to be equivalent to a formula:

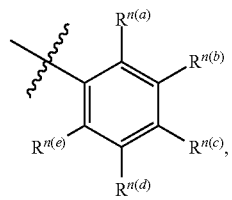

wherein n is typically an integer. That is, $R''$ is understood to represent five independent substituents, $R''^{(a)}$, $R''^{(b)}$, $R''^{(c)}$, $R''^{(d)}$, and $R''^{(e)}$. By "independent substituents," it is meant that each R substituent can be independently defined. For example, if in one instance $R''^{(a)}$ is halogen, then $R''^{(b)}$ is not necessarily halogen in that instance.

Unless otherwise specified, pressures referred to herein are based on atmospheric pressure (i.e. one atmosphere).

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

ASPECTS

The present disclosure can be described in accordance with the following numbered aspects, which should not be confused with the claims.

Aspect 1. A method for making a crosslinked poly(ether imide) polymeric film, the method comprising:
(a) casting an azide-containing poly(ether imide) polymer into a film; and
(b) heating the polymer to a crosslinking temperature to crosslink the polymer.

Aspect 2. The method of aspect 1, wherein the azide-containing poly(ether imide) polymer is cast from a solution or a melt.

Aspect 3. The method of aspect 2, wherein the azide-containing poly(ether imide) polymer is dissolved in a solvent prior to casting from a solution.

Aspect 4. The method of aspect 3, wherein the solvent comprises dichloromethane, trichloromethane, bromomethane, N, N-dimethylformamide, dimethylacetamide, N-methyl-2-pyrrolidone, dimethyl sulfoxide, chlorobenzenes, water, methanol, ethanol, acetic acid, or any combination thereof.

Aspect 5. The method of aspect 4, wherein the water has a pH of less than 11.

Aspect 6. The method of any one of aspects 1-5, wherein heating the polymer further comprises annealing.

Aspect 7. The method of any one of aspects 1-6, wherein the crosslinking temperature is from about 150° C. to about 300° C.

Aspect 8. The method of any one of aspects 1-7, wherein the heating the polymer comprises gradually raising the temperature from a first temperature to the crosslinking temperature.

Aspect 9. The method of any one of aspects 1-8, wherein the azide-containing poly(ether imide) polymer has a structure of Formula I:

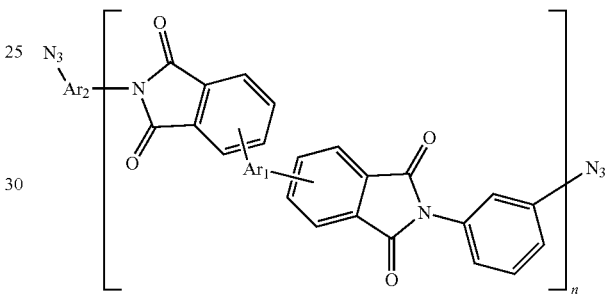

Formula I wherein n is from 5 to 100; and
wherein $Ar_1$ and $Ar_2$ independently comprise substituted or unsubstituted aromatic or diaromatic groups.

Aspect 10. The method of aspect 9, wherein $Ar_1$ is selected from

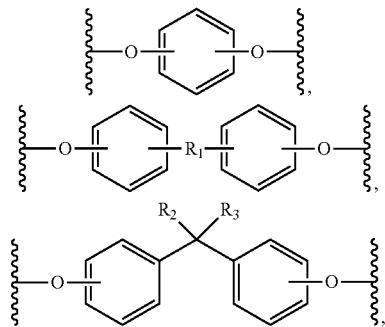

or any combination thereof;
wherein $R_1$ is selected from phenylene, O, C(=O)O, S(=O)$_2$, C(=O)O$_2$, C(=O), $C_xH_{2x}$, or any combination thereof;
wherein x is from 0 to 5; and
wherein $R_2$ and $R_3$ are independently selected from trifluoromethyl, trichloromethyl, tribromomethyl, hydroxyl, thiol, fluoro, chloro, bromo, hydrogen, $C_1$-$C_5$ alkyl, or any combination thereof.

Aspect 11. The method of aspect 9 or 10, wherein $Ar_2$ is selected from

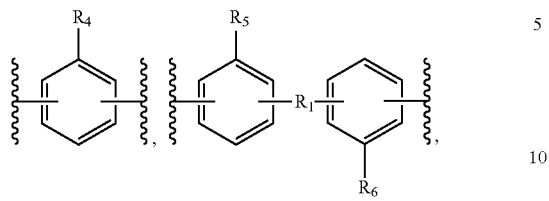

or any combination thereof;

wherein $R_1$ is selected from phenylene, O, C(=O)O, S(=O)$_2$, C(=O)O$_2$, C(=O), $C_xH_{2x}$, or any combination thereof;

wherein x is from 0 to 5;

wherein $R_4$, $R_5$, and $R_6$ are independently selected from hydrogen, nitro, fluoro, chloro, bromo, $C_yH_{2y+1}$, or any combination thereof; and wherein y is from 1 to 5.

Aspect 12. The method of any one of aspects 9-11, wherein the azide-containing poly(ether imide) polymer has a structure of Formula II:

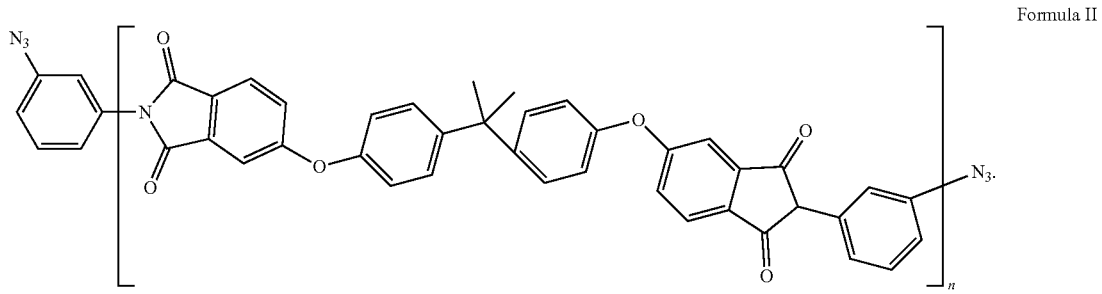

Formula II

Aspect 13. The method of any one of aspects 9-12, wherein n is from about 5 to about 90.

Aspect 14. The method of any one of aspects 9-13, wherein the polymer has a molecular weight of from about 2 to about 50 kDa.

Aspect 15. The method of any one of aspects 9-14, wherein the polymer is not explosive.

Aspect 16. A crosslinked polymeric film produced by the method of any one of aspects 1-15.

Aspect 17. A crosslinked polymeric film comprising a plurality of polymeric units of Formula III:

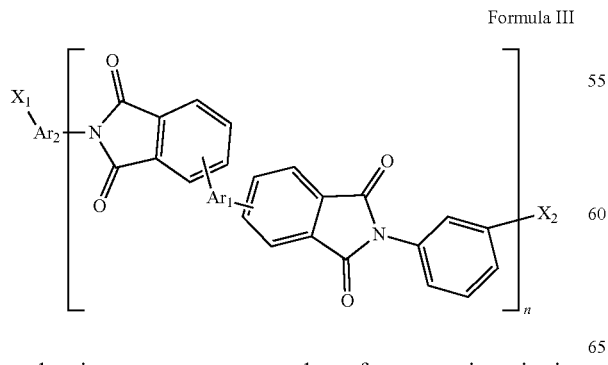

Formula III wherein n represents a number of monomeric units in each polymeric unit;

wherein n is from 5 to 100;

wherein $Ar_1$ and $Ar_2$ independently comprise substituted or unsubstituted aromatic or diaromatic groups; and wherein at least one implicit hydrogen of at least one monomeric unit of each polymeric unit of the plurality comprises an amine linkage to at least one of $X_1$ or $X_2$ of at least one other polymeric unit of the plurality.

Aspect 18. The crosslinked polymeric film of aspect 17, wherein $Ar_1$ is selected from

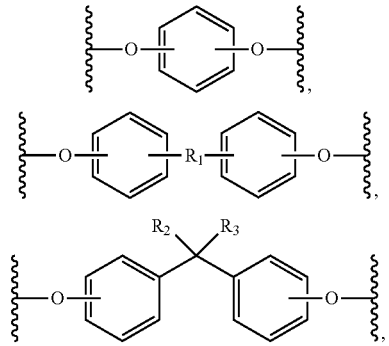

or any combination thereof;
wherein $R_1$ is selected from phenylene, O, C(=O)O, S(=O)$_2$, C(=O)O$_2$, C(=O), C$_x$H$_{2x}$, or any combination thereof;
wherein x is from 0 to 5; and
wherein $R_2$ and $R_3$ are independently selected from trifluoromethyl, trichloromethyl, tribromomethyl, hydroxyl, thiol, fluoro, chloro, bromo, hydrogen, C$_1$-C$_5$ alkyl, or any combination thereof.

Aspect 19. The crosslinked polymeric film of aspect 17 or 18, wherein Ar$_2$ is selected from

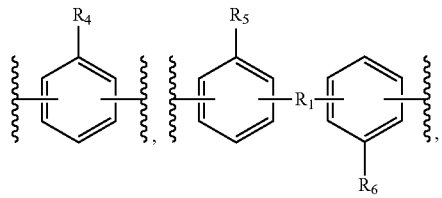

or any combination thereof;
wherein $R_1$ is selected from phenylene, O, C(=O)O, S(=O)$_2$, C(=O)O$_2$, C(=O), C$_x$H$_{2x}$, or any combination thereof;
wherein x is from 0 to 5;
wherein $R_4$, $R_5$, and $R_6$ are independently selected from hydrogen, nitro, fluoro, chloro, bromo, C$_y$H$_{2y+1}$, or any combination thereof; and
wherein y is from 1 to 5.

Aspect 20. The crosslinked polymeric film of any one of aspects 17-19 wherein the film comprises a plurality of polymeric units of Formula IV:

Aspect 21. The crosslinked polymeric film of any one of aspects 16-20, wherein the crosslinked polymeric film does not reversibly decrosslink at elevated temperatures.

Aspect 22. The crosslinked polymeric film of any one of aspects 16-21, wherein the crosslinked polymeric film has a glass transition temperature (T$_g$) of from about 150° C. to about 250° C.

Aspect 23. The crosslinked polymeric film of any one of aspects 16-22, wherein the crosslinked polymeric film has a thermal decomposition temperature (T$_d$) of from about 500° C. to about 600° C.

Aspect 24. The crosslinked polymeric film of any one of aspects 16-23, wherein the crosslinked polymeric film has a storage modulus at 100° C. and 1 Hz of from about 1.25 to about 1.8 GPa.

Aspect 25. The crosslinked polymeric film of any one of aspects 16-24, wherein the crosslinked polymeric film has an equilibrium modulus at 300° C. and 1 Hz of from about 1.2 to about 2.35 MPa.

Aspect 26. The crosslinked polymeric film of any one of aspects 16-25, wherein the crosslinked polymeric film has a crosslinking density of from about 0.09 to about 0.18 kmol/m$^3$.

Aspect 27. The crosslinked polymeric film of any one of aspects 16-26, wherein the crosslinked polymeric film has a tensile stress of from about 80 to about 120 MPa at room temperature using a strain rate of 5 mm/min.

Aspect 28. The crosslinked polymeric film of any one of aspects 16-27, wherein the crosslinked polymeric film has a tensile strain of from about 1 to about 5.1% at room temperature using a strain rate of 5 mm/min.

Aspect 29. The crosslinked polymeric film of any one of aspects 16-28, wherein the crosslinked polymeric film has a Young's modulus of from about 2 to about 4 GPa at room temperature using a strain rate of 5 mm/min.

Aspect 30. The crosslinked polymeric film of any one of aspects 16-29, wherein the crosslinked polymeric film is resistant to dissolution in at least one solvent.

Aspect 31. The crosslinked polymeric film of aspect 30, wherein the at least one solvent comprises dichloromethane, trichloromethane, bromomethane, N,N-dimethylformamide, dimethylacetamide, N-methyl-2-pyrrolidone, dimethyl sulfoxide, chlorobenzenes, water, methanol, ethanol, acetic acid, or any combination thereof.

Aspect 32. The crosslinked polymeric film of aspect 31, wherein the at least one solvent comprises water having a pH of less than 11.

Aspect 33. An article comprising the crosslinked polymeric film of any one of aspects 16-32.

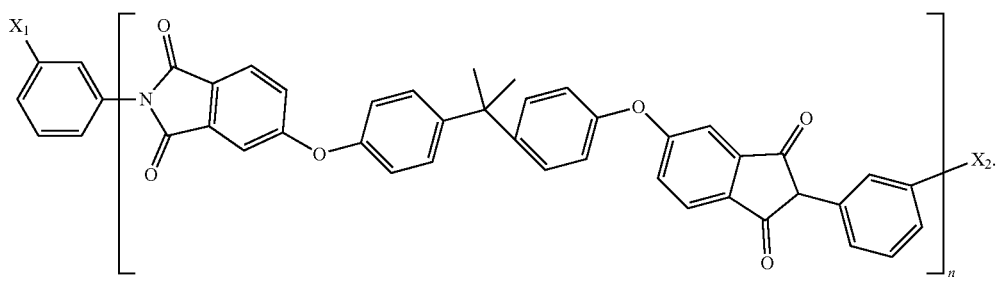

Formula IV

Aspect 34. The article of aspect 33, wherein the article comprises a coating, a film, a filtration membrane, battery separator, fuel cell membrane, gas separation membrane, or any combination thereof.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Materials 2,2-Bis[4-(3,4-dicarboxyphenoxy)phenyl]propane dianhydride (BPADA, ≥97%, Sigma-Aldrich) was subjected to one heating-cooling cycle to remove moisture. m-Phenylenediamine (mPD, 99%, Sigma-Aldrich) was purified by sublimation. o-Dichlorobenzene (oDCB, ≥99%, Sigma-Aldrich), dichloromethane (DCM, Fisher Chemical), chloroform (HPLC, Fisher Chemical), tetrahydrofuran (THF, Fisher Chemical), N-methyl formamide (DMF, analytical pure, Acros Organics), N-methyl pyrrolidone (NMP, 99%, Sigma-Aldrich), sodium azide ($NaN_3$, ≥98%, Sigma-Aldrich), sodium nitrite ($NaNO_2$, ≥98%, Sigma-Aldrich), acetone (analytical pure, Acros Organics), hexanes (VWR chemicals), methanol (VWR chemicals), concentrated sulfuric acid ($H_2SO_4$, wt %≥98%, Fisher Chemical), and deuterated chloroform ($CDCl_3$, 99.8%, Cambridge Isotope Laboratories, Inc.) were used as received.

Example 2: Characterization

Proton nuclear magnetic resonance ($^1H$ NMR) spectroscopy was performed on a Varian Unity 400 spectrometer at 399.98 MHz in $CDCl_3$. Thermogravimetric analysis (TGA) was performed on a Discovery TGA5500 thermogravimetric analyzer (TA Instruments). Polymers were preheated at 200° C. for 10 min, and then the weight changes were measured from 200 to 800° C. at a ramp rate of 10° C.·$min^{-1}$ under a nitrogen stream of 25 mL·$min^{-1}$. Number average molecular weight ($M_n$) was measured via an EcoSEC HLC-8320GPC size exclusion chromatography equipped with two TSKgel SuperHM-H columns, a refractive index detector, and a multi-angle light scattering detector (SEC-MALS) at 50° C. with flow rate of 0.5 mL·$min^{-1}$. The mobile phase for the SEC-MALS was DMF containing 0.05 M LiBr. Fourier transform infrared spectroscopy (FTIR) was performed at room temperature using a PerkinElmerATR-FTIR (model Spectrum 100) in the range of 4000-1000 $cm^{-1}$ with 256 scans and resolution of 4 $cm^{-1}$. Dynamic mechanical analysis (DMA) was performed on a DMA Q800 (TA Instruments) equipped with film tension clamps. The films were fixed in the tension clamps with a torque of 3 N and a preloaded force of 0.01 N. Using DMA, the storage modulus (tensile modulus, E') was obtained under a constant strain mode with a strain of 0.04%, frequency of 1 Hz, and heat rate of 3° C.·$min^{-1}$. Field-emission scanning electron microscope (SEM, LEO 1550) was operated at an acceleration voltage of 2 kV and a working distance of ~3 mm. An iridium layer of ~2 nm was deposited on the polymer membranes using a sputter coater (Leica EM ACE600) to make the membranes electrically conductive. Ultraviolet-visible (UV-vis) spectra were acquired using an Agilent Cary 5000 UV-vis-NIR spectrophotometer with resolution of 1 nm. The measurements were conducted in a film sample cell at scan rate of 600 nm·$min^{-1}$.

Example 3: Synthesis of Poly(ether imide)s

Figure 1B:
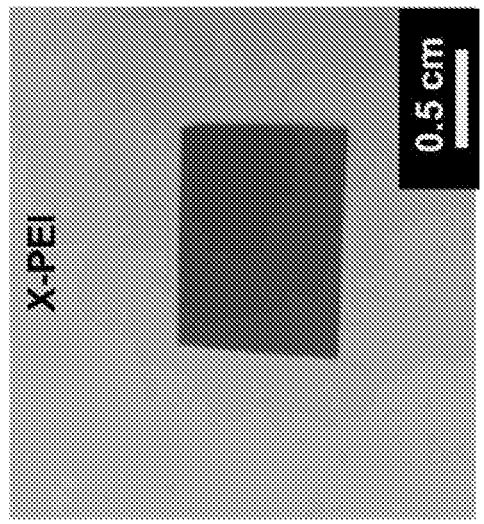
Figure 1B:
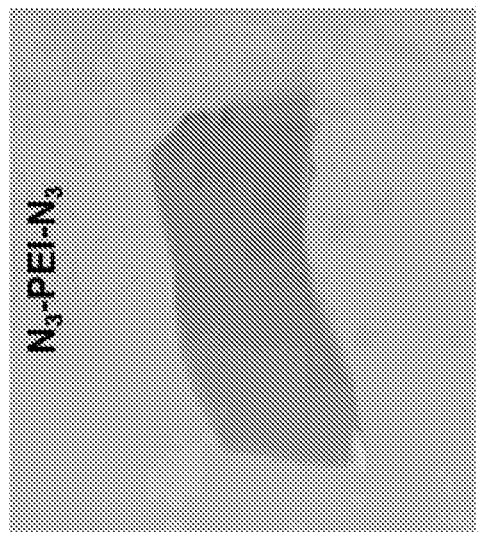
Figure 1B:
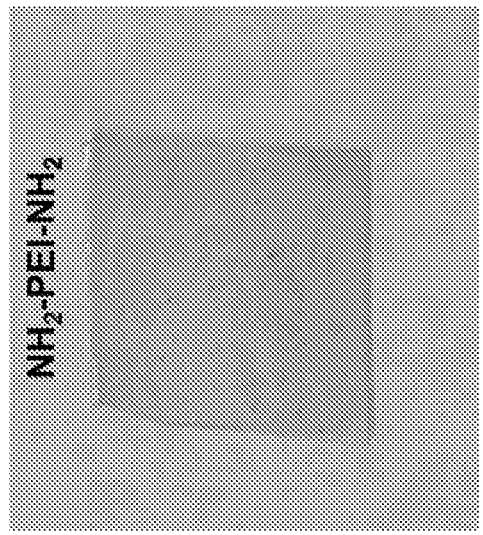

Amine-terminated PEIs ($NH_2$-PEI-$NH_2$) with varying targeted $M_n$ were synthesized following a previously reported procedure. The azide-terminated PEI ($N_3$-PEI-$N_3$) was prepared via heterogeneous diazotization-azidation (FIGS. 1A-1B). In a typical synthesis of $N_3$-PEI-$N_3$ ($M_n$=8.9 kDa, 1.0 g), $H_2SO_4$ (2.0 mL) was added dropwise into deionized water (6.0 mL) in a round bottom flask equipped with a stir bar. The round bottom flask was then placed in an ice bath. $NH_2$-PEI-$NH_2$ ($M_n$=8.9 kDa) solution in DMF (10.0 mL) was added dropwise into the round bottom flask with constant stirring. The suspension was stirred for 30 min to stabilize the temperature at 0° C. Subsequently, a cold $NaNO_2$ aqueous solution (6.0 mL, 0.5 M) was added into the round bottom flask. After 4 h at 0° C., an aqueous solution of sodium azide (3.0 mL, 1 M) was combined with the suspension in the flask. After 12 h at room temperature, the resultant $N_3$-PEI-$N_3$ was filtered, washed by DI water, followed by acetone, and then dried in vacuo at 40° C.

Figure 2A:
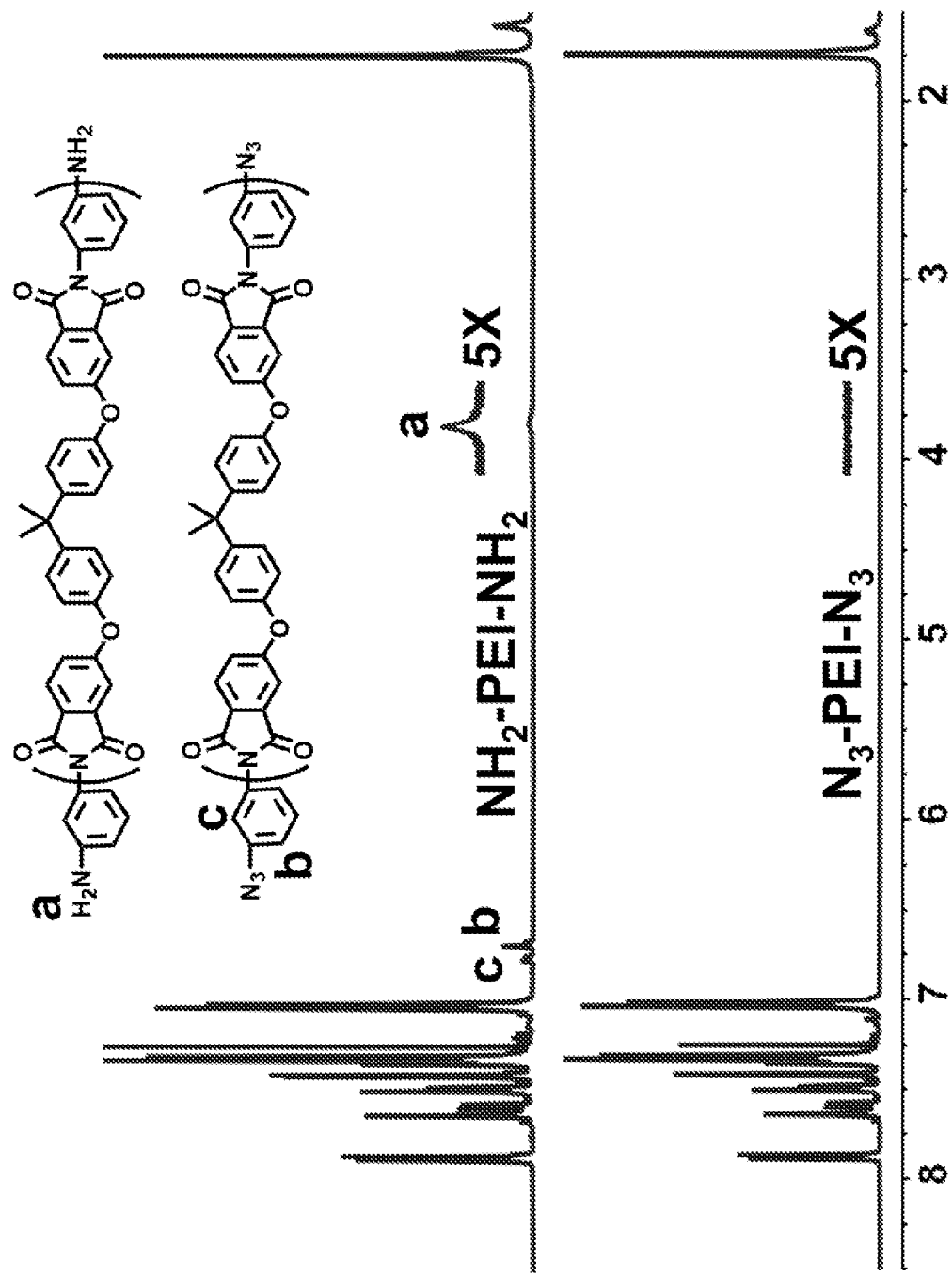
FIG. 2A shows $^1$H NMR of $NH_2$-PEI-$NH_2$ and $N_3$-PEI-$N_3$ with $M_n$=8.9 kDa. Peaks marked a, b, and c correspond to protons marked a, b, and c.
Figure 2B:
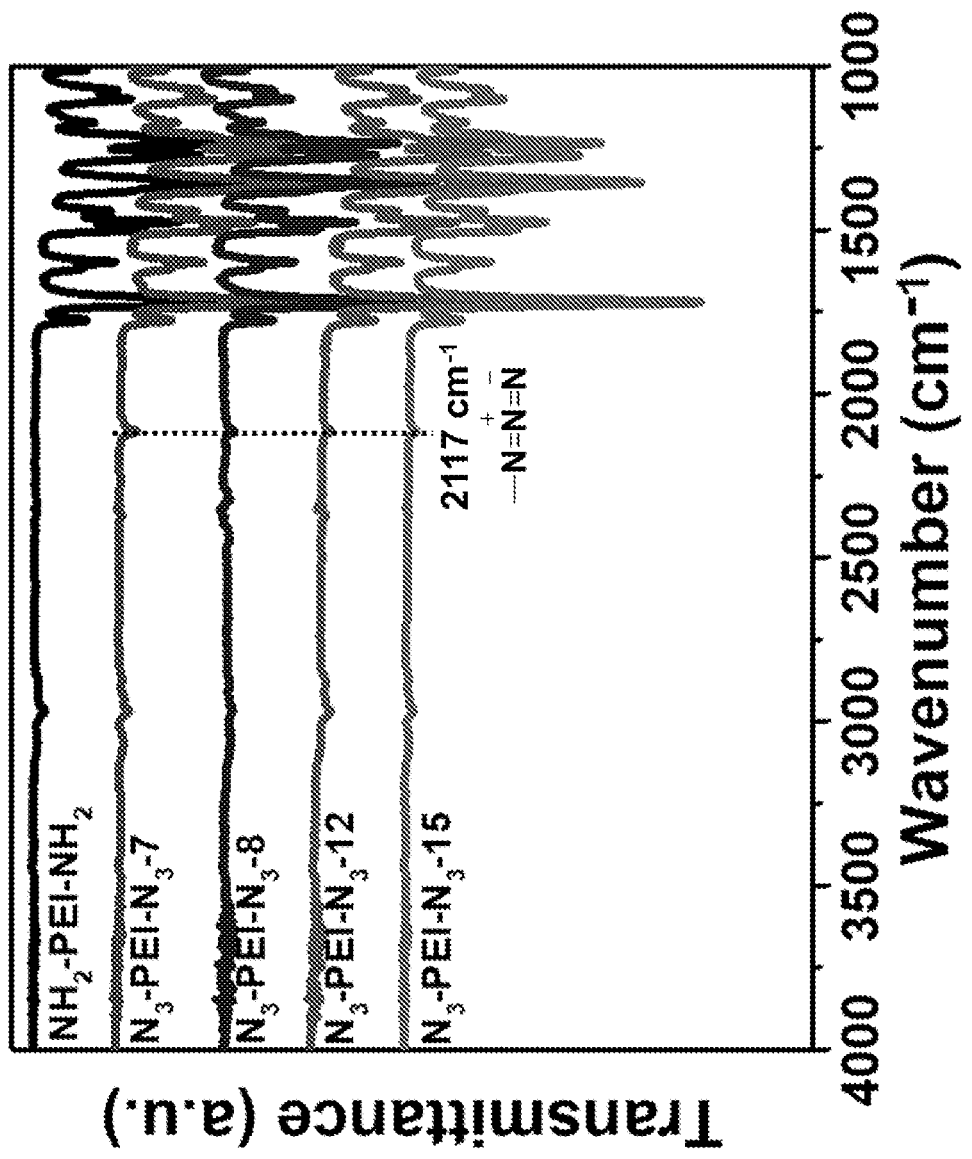
FIG. 2B shows FTIR spectra of $NH_2$-PEI-$NH_2$ ($M_n$=8.9 kDa) and $N_3$-PEI-$N_3$ with varying molar mass.
Figure 3:
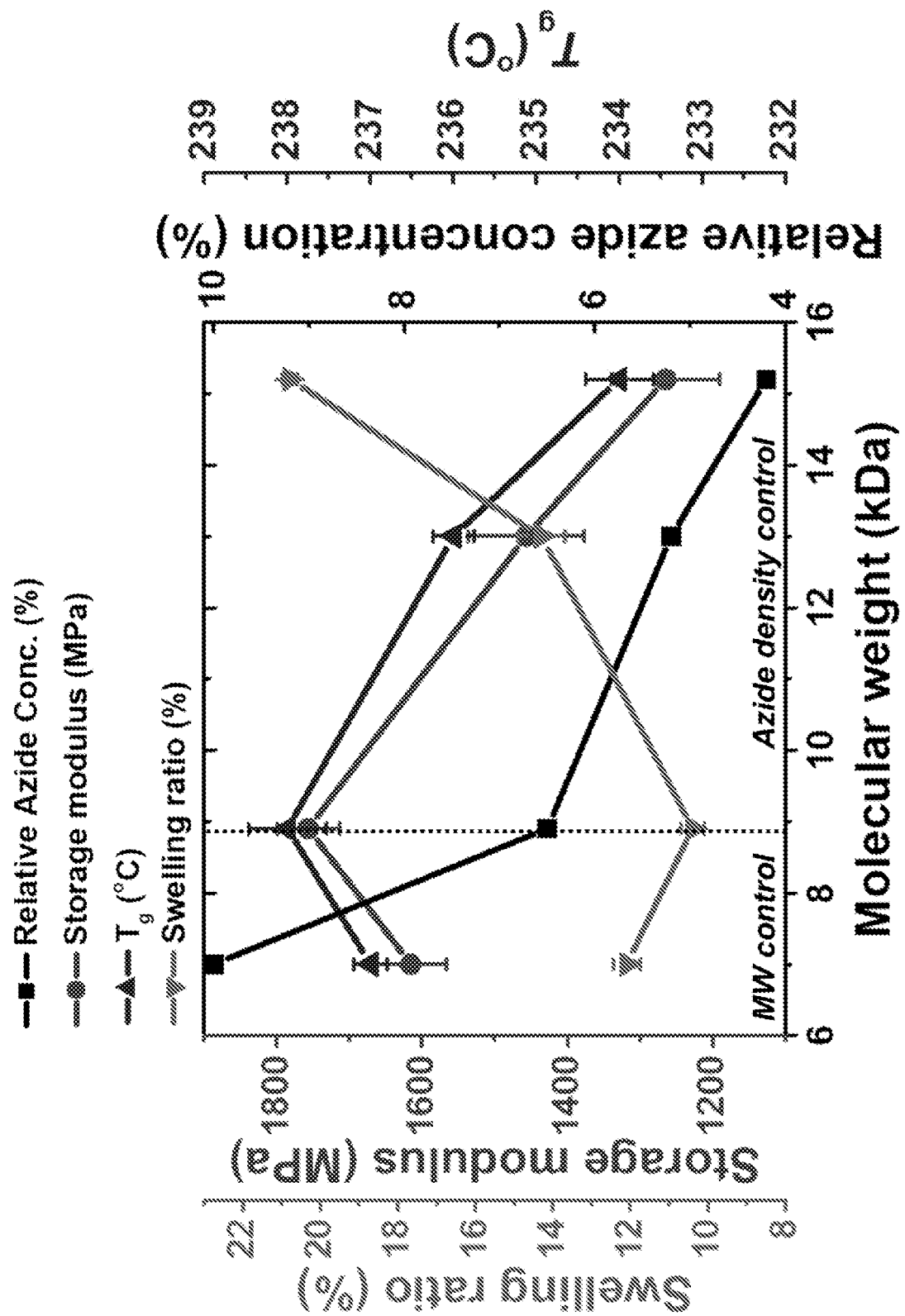
FIG. 3 shows a summary of the correlations among the molar mass of $N_3$-PEI-$N_3$, azide concentration, $T_g$, storage modulus at 100° C., and swelling ratio of X-PEIs in chloroform.
Figure 4A:
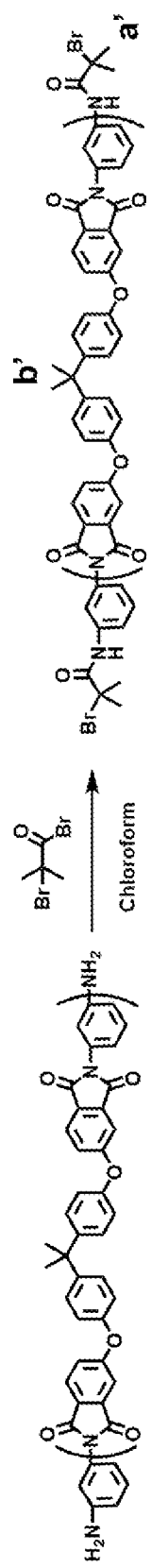
FIGS. 4A-4C show number average molecular weight of Br-functionalized PEI (FIG. 4A) characterized by $^1$H NMR end-group analysis (FIG. 4B) and SEC-MALS (FIG. 4C). The $^1$H NMR was performed on a Varian Unity 400 spectrometer at 399.98 MHz in $CDCl_3$. SEC-MALS was performed at 50° C. with flow rate of 0.5 mL·min$^{-1}$. The mobile phase for the SEC was DMF containing 0.05 M LiBr.
Figure 4B:
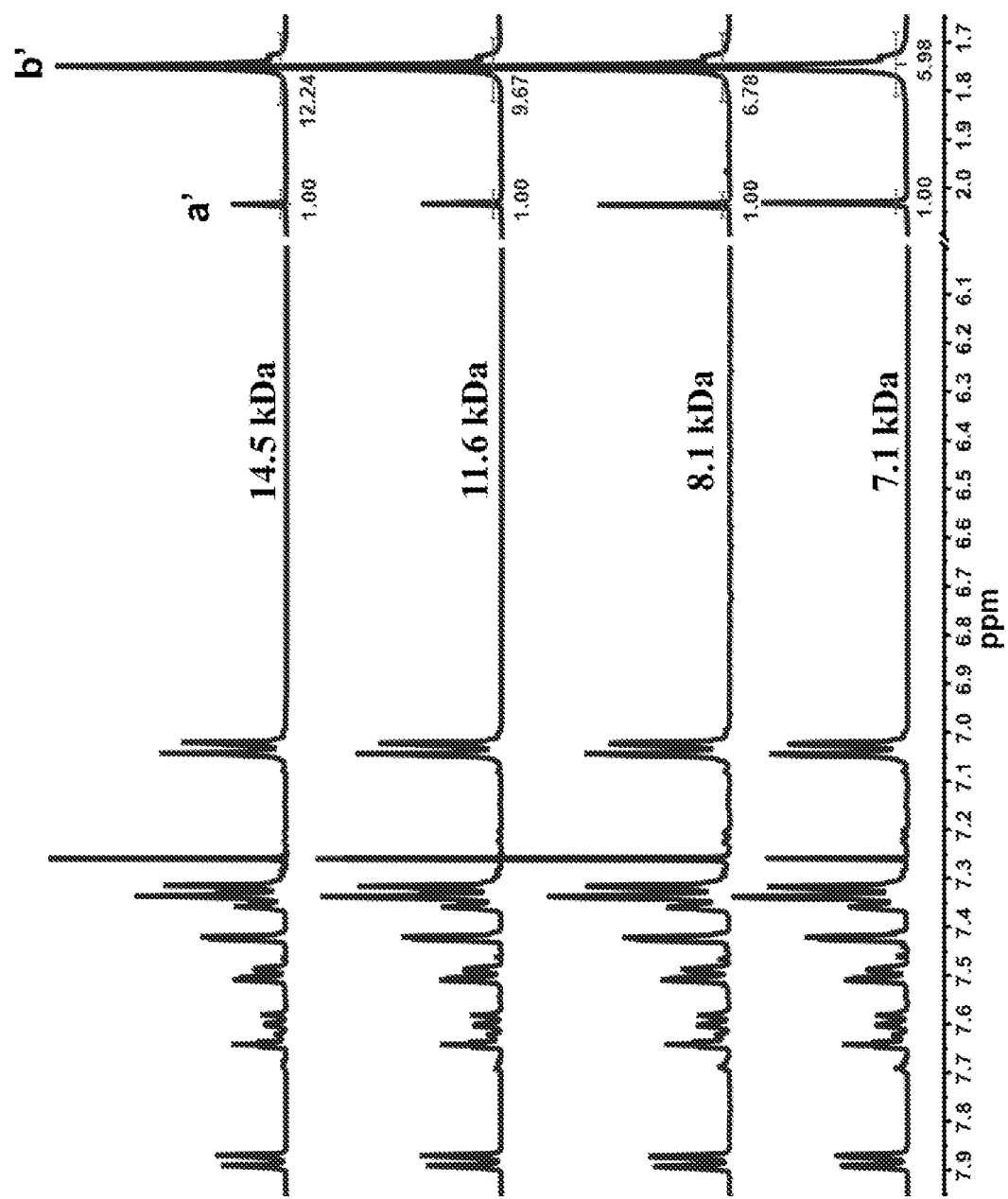
Figure 4C:
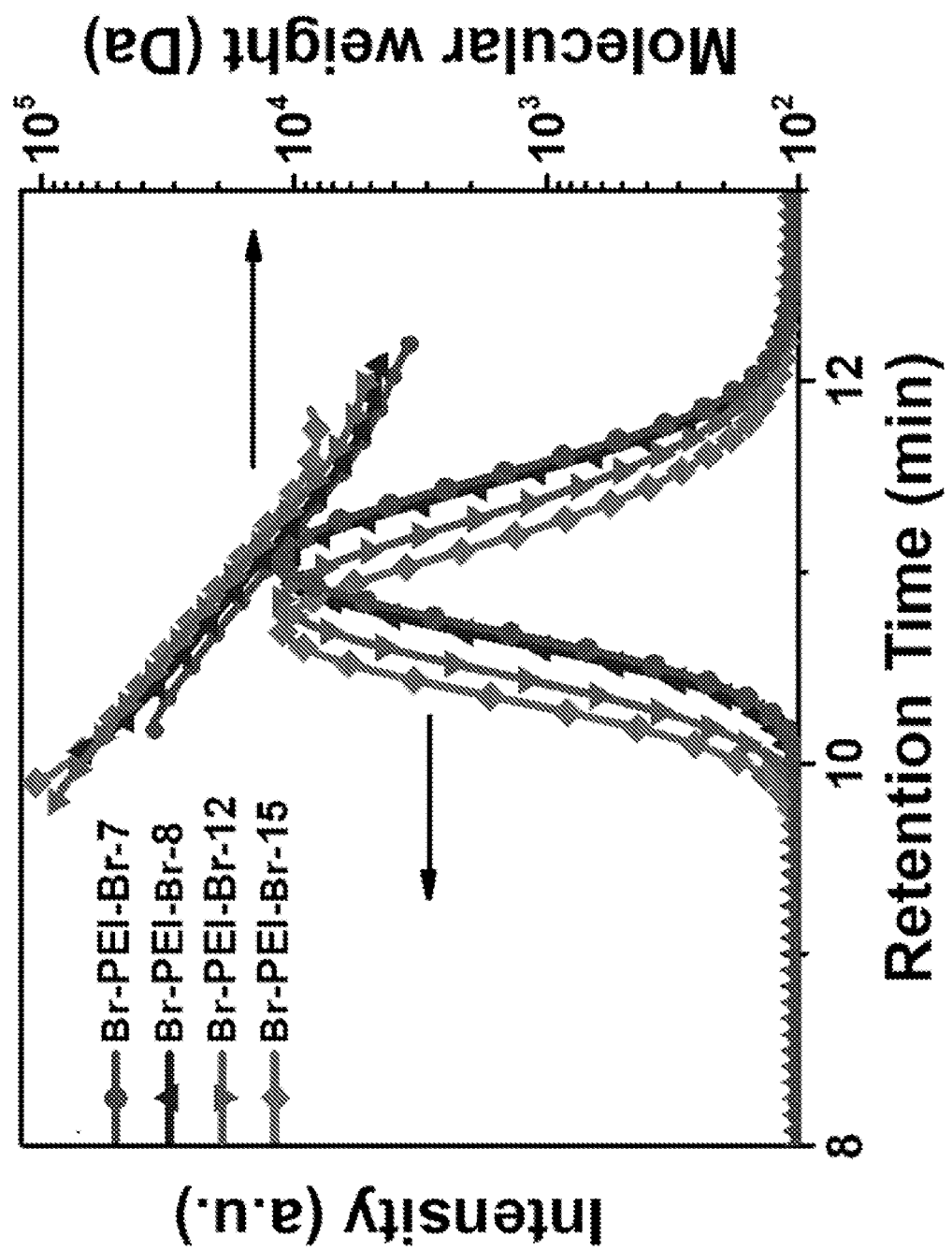

Results: Synthesis of $NH_2$-PEI-$NH_2$ and $N_3$-PEI-$N_3$. Azide-terminated PEIs were synthesized via two steps (FIG. 1A). First, $NH_2$-PEI-$NH_2$ was synthesized using polycondensation following previous reports. By controlling the feed ratio between BPADA and mPD, $NH_2$-PEI-$NH_2$ had $M_n$ that ranged from 7.1 to 15.2 kDa. In the $^1H$ NMR spectrum of a typical $NH_2$-PEI-$NH_2$ (FIG. 2A), the broad peak a at ~3.8 ppm corresponded to the terminal amine groups, whereas the peaks b and c at ~6.8 ppm corresponded to the two protons of the terminal benzene ring. Second, $NH_2$-PEI-$NH_2$ was converted to $N_3$-PEI-$N_3$ via a heterogenous diazotization-azidation reaction (FIG. 1A). In the $^1H$ NMR spectrum of a $N_3$-PEI-$N_3$ (FIG. 2A), peak a completely vanished, an indication of successful conversion of amine to azide. Additionally, due to a de-shielding effect of the electron-withdrawing azide group, peaks b and c up-shifted and overlapped the PEI backbone signals (~7.0-8.0 ppm). The azide groups in $N_3$-PEI-$N_3$ were confirmed by the strong IR stretching at 2117 $cm^{-1}$ (FIG. 2B). The relative azide concentration correlated negatively with the molar mass of PEI (FIG. 3), as characterized by FTIR, SEC-MALS and end-group analysis using $^1H$ NMR (FIGS. 4A-4C and Table 1). To avoid the deleterious interaction of $NH_2$-PEI-$NH_2$ and $N_3$-PEI-$N_3$ with the SEC column, as well as to assure the accuracy of both SEC-MALS and end-group analysis, the amine end-group was converted to 2-bromo isobutyryl group following a previous report. The resultant bromo-terminated PEIs (Br-PEI-Br) exhibited a sharp methyl peak at 2.03 ppm in the $^1H$ NMR spectra (FIG. 4B).

TABLE 1

Physical Properties of $N_3$-PEI-$N_3$ and X-PEIs

| | $M_n$ (kDa) | | $T_g$ (° C.) | | $T_d$ | E' | Equilibrium E' | Crosslinking Density | Swelling Ratio | | |
|---|---|---|---|---|---|---|---|---|---|---|---|
| | NMR | SEC | DSC | DMA | (° C.) | $(GPa)^b$ | $(MPa)^c$ | $(kmol/m^3)^d$ | $CH_2Cl_2$ | $CHCl_3$ | THF |
| X-PEI-$7^a$ | 7.1 | 7.1 | 223 | 237 | 541 | 1.61 ± 0.05 | 1.97 ± 0.07 | 0.152 | 13.9 ± 0.4 | 12.1 ± 0.7 | 15.7 ± 1.1 |
| X-PEI-8 | 8.1 | 8.9 | 224 | 238 | 544 | 1.76 ± 0.04 | 2.29 ± 0.06 | 0.177 | 11.2 ± 0.8 | 10.4 ± 0.6 | 4.0 ± 0.3 |

TABLE 1-continued

Physical Properties of $N_3$-PEI-$N_3$ and X-PEIs

| | $M_n$ (kDa) | | $T_g$ (° C.) | | $T_d$ | E' | Equilibrium E' | Crosslinking Density | Swelling Ratio | | |
|---|---|---|---|---|---|---|---|---|---|---|---|
| | NMR | SEC | DSC | DMA | (° C.) | (GPa)[b] | (MPa)[c] | (kmol/m³)[d] | $CH_2Cl_2$ | $CHCl_3$ | THF |
| X-PEI-12 | 11.6 | 12.8 | 223 | 236 | 549 | 1.46 ± 0.08 | 1.84 ± 0.21 | 0.142 | 15.3 ± 0.3 | 14.3 ± 1.2 | 19.2 ± 1.0 |
| X-PEI-15 | 14.5 | 15.2 | 222 | 234 | 552 | 1.27 ± 0.07 | 1.24 ± 0.11 | 0.096 | 25.6 ± 1.1 | 20.8 ± 0.4 | 25.6 ± 1.2 |
| Ultem 1010 | — | — | 217 | 226 | 558 | 1.43 ± 0.04 | — | — | 40.4 ± 2.0 | 42.1 ± 1.5 | 41.3 ± 1.1 |

[a]The number after X-PEI refers to the number average molecular weight (in kDa) of PEI prepolymer as determined by NMR.
[b]The storage moduli (tensile moduli, E') were measured by DMA at 100° C.
[c]The equilibrium moduli were measured by DMA at 300° C.
[d]The crosslinking density was calculated using Equation (2).

Example 4: Preparation and Properties of Crosslinked PEI (X-PEI) Film $N_3$-PEI-$N_3$ was dissolved in DCM and then solution-cast into a PTFE dish. The solution-cast films were thermally annealed and crosslinked in a vacuum oven at programmed temperatures. Starting at 120° C., the oven temperature was ramped to 160° C. at a rate of 10° C.·h⁻¹. From 160 to 180° C., the ramp rate was reduced to 5° C.·h⁻¹ to prevent film foaming. Once the temperatures reached 180° C., the ramp rate was increased to 40° C.·h⁻¹ and then the oven was kept isothermal at 230° C. for 24 h to crosslink $N_3$-PEI-$N_3$.

Figure 5:
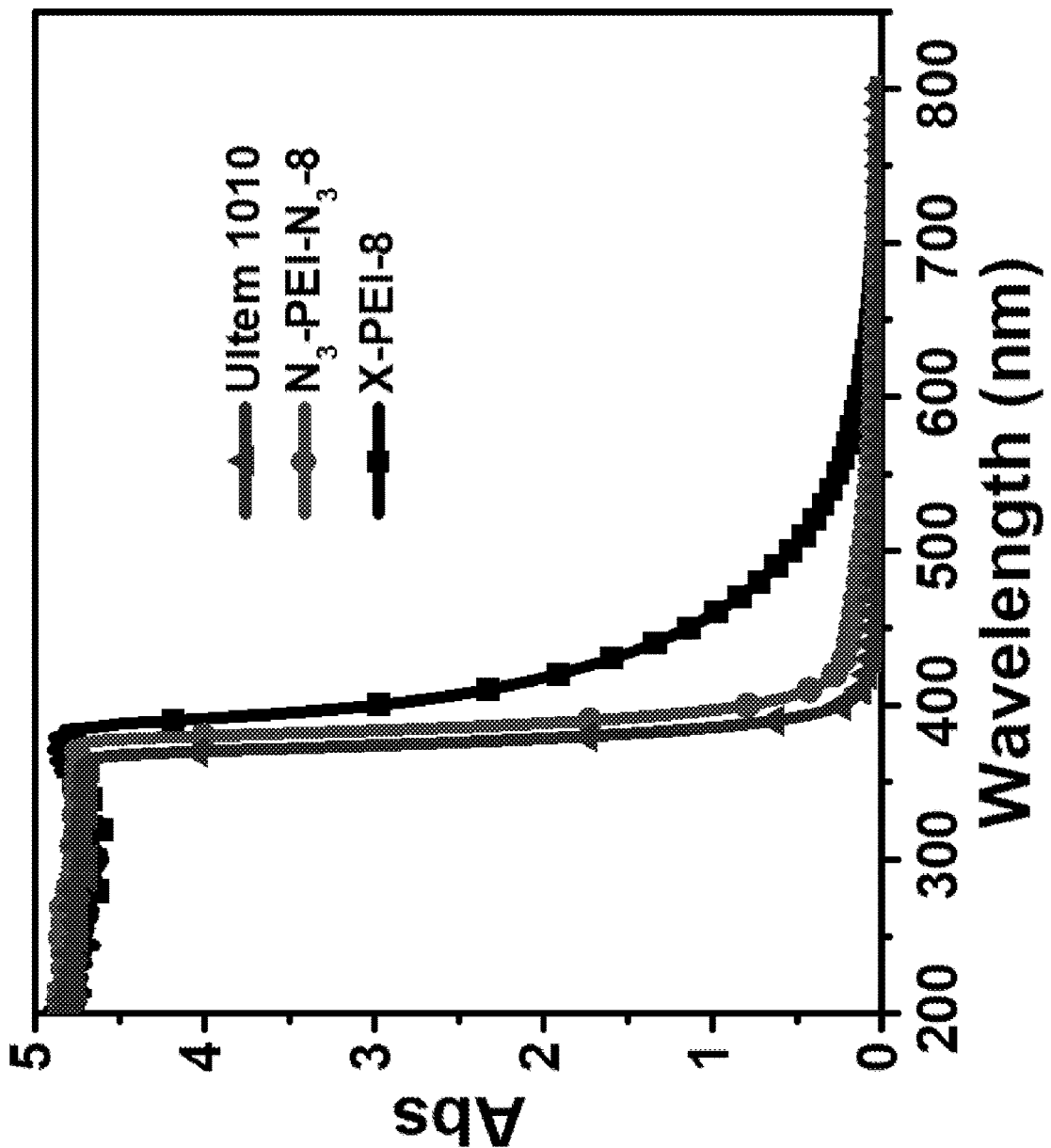
FIG. 5 shows UV-vis spectra of Ultem 1010, $N_3$-PEI-$N_3$-8, and X-PEI-8 films. All spectra were normalized to the absorption intensity of Ultem 1010 in the UV range. The resolution of the measured spectra was 1 nm, and scan rate was 600 nm·min$^{-1}$.

Results: Film preparation and yellowness. $N_3$-PEI-$N_3$ were dissolved in DCM and solution-cast into films in Teflon molds. The films were thermally annealed in a temperature-programmed vacuum oven. $N_3$-PEI-$N_3$ showed stronger absorption of blue and green light, and thus it appeared yellower than $NH_2$-PEI-$NH_2$, as shown by photography and UV-vis spectroscopy (FIGS. 1A-1B and FIG. 5). The stronger absorption of blue and green light is partially attributed to the azide groups that absorb light at ~350 nm, similar to other organic azides. The charge-transfer complex (CTC) in $N_3$-PEI-$N_3$ also contributes to the stronger light absorption. The electron deficient —$N_3$ further enhances the CTC interactions, resulting in a deep yellowness. The deeper color of X-PEIs (FIGS. 1A-1B and FIG. 5) than $N_3$-PEI-$N_3$ is attributed to two reasons. First, it is known that organic azides go through a thermolysis reaction to yield nitrene after thermal treatment. The nitrene incorporated with alkyl or aryl moieties on the PEI backbone through radical insertion reactions, forming amine linkages. The electron-donating moieties (—NH—) bonded to the PEI backbone, leading to high electron density in the CTC, and therefore X-PEIs showed the strongest absorption of blue, green, and yellow light among all PEIs. In contrast, $NH_2$-PEI-$NH_2$ did not crosslink after thermal annealing, and its yellowness remained unchanged. Second, phenyl azides produce amines, azo-compounds, hydrazines, dehydroazepines, and aziridines through complex mechanisms. The intermolecular reactions between these moieties could yield chromophores with deep colors, similar to a previous report where the reaction between azide and dehydroazepine produces unidentified "tar" in a deep brown color.

Figure 6:
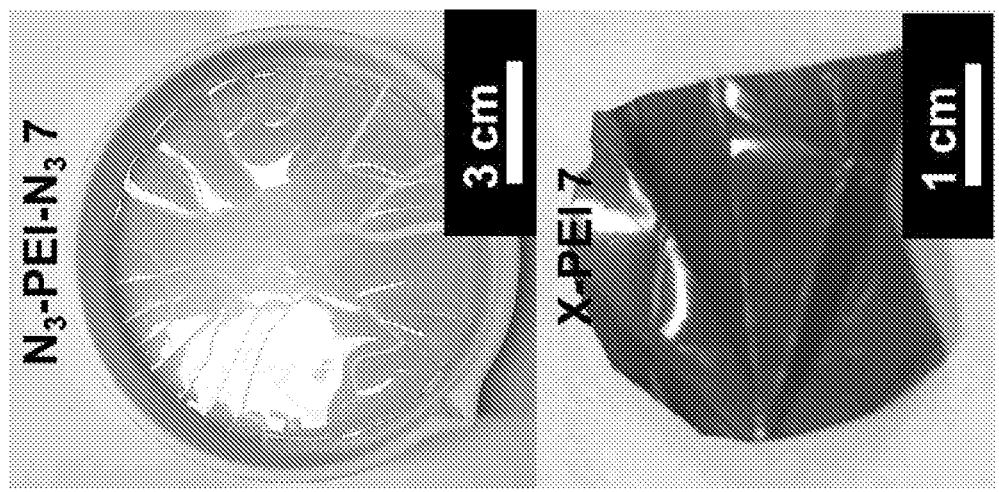
FIG. 6 shows a flexibility test of $N_3$-PEI-$N_3$-7 and X-PEI-7 (top). Before crosslinking, $N_3$-PEI-$N_3$-7 cannot form intact films by solution casting. After crosslinking (bottom), an X-PEI-7 film showed drastically improved flexibility. The film remained intact after abusive folding, stretching, and tension.
Figure 7A:
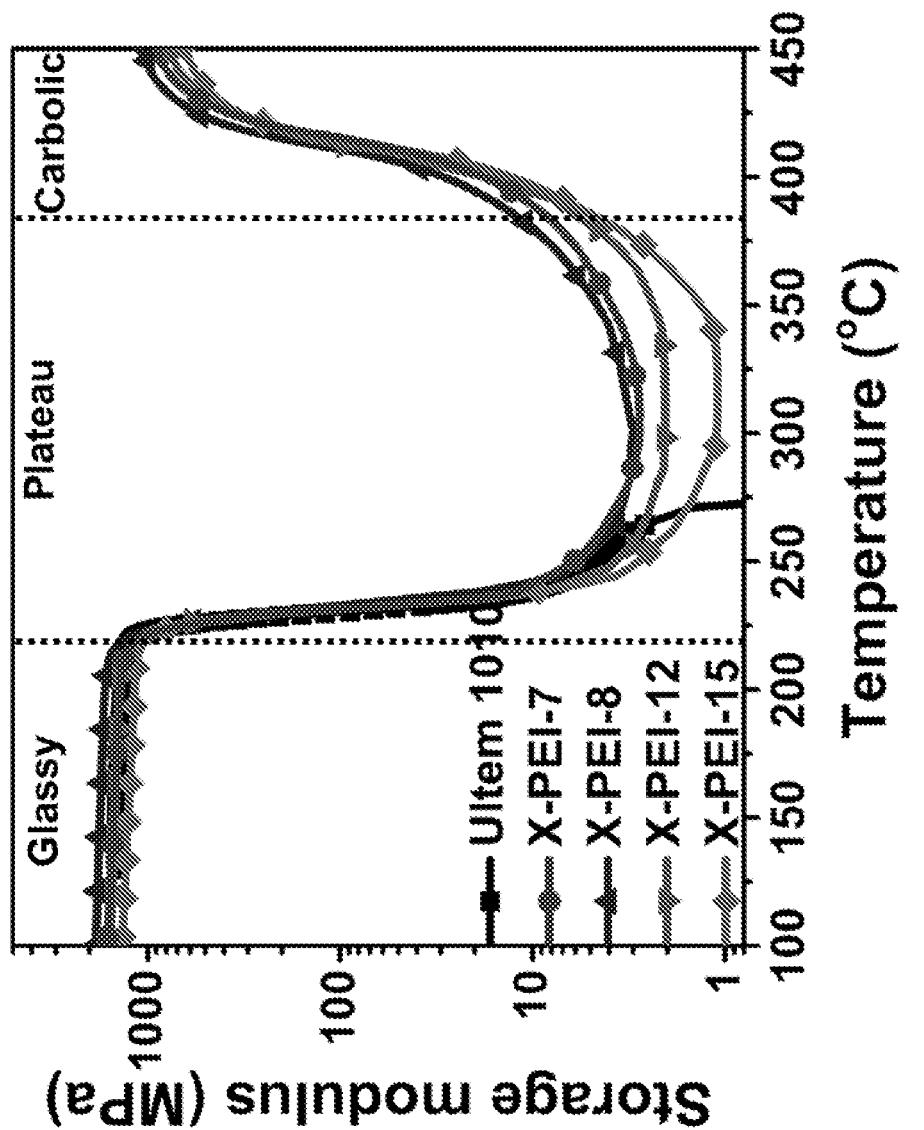
FIG. 7A-7B show, respectively, storage moduli and tan δ of Ultem 1010 and X-PEIs.
Figure 7B:
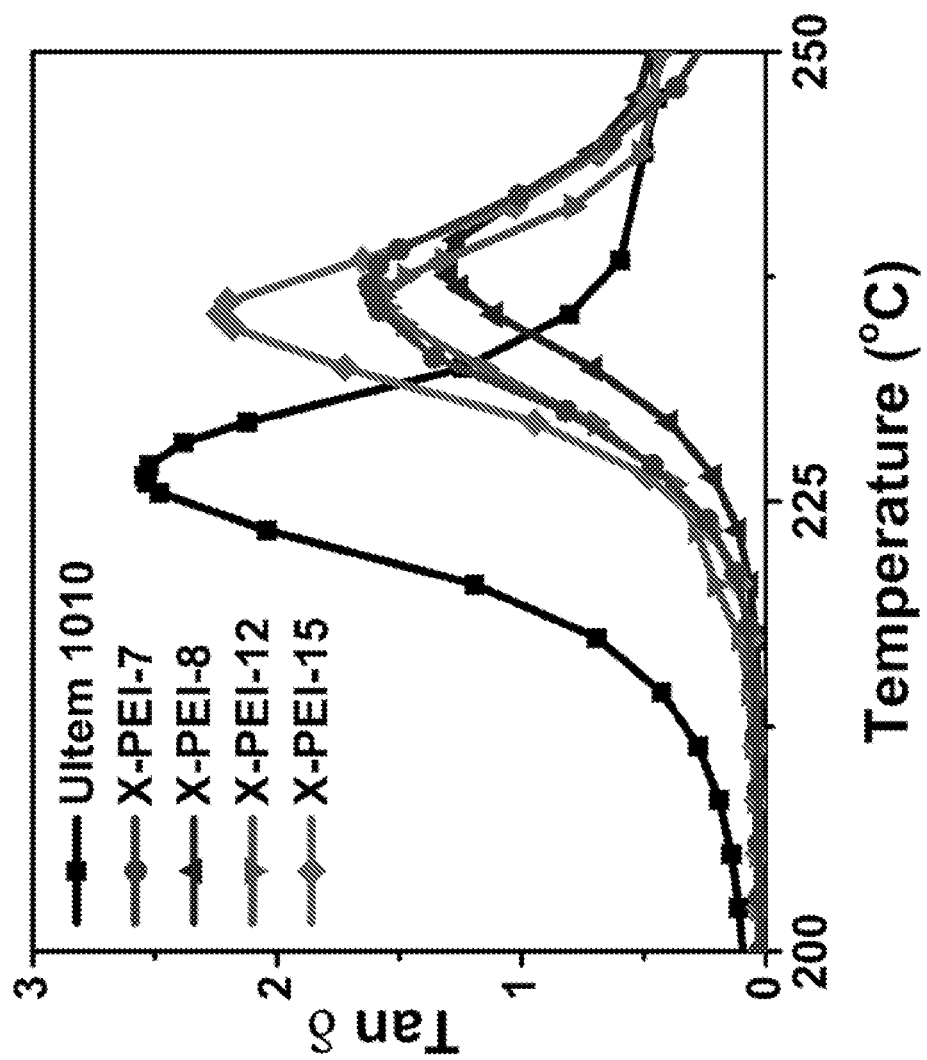

Results: Mechanical Properties. After crosslinking, the film flexibility changed drastically. For example, $N_3$-PEI-$N_3$-7 film was not self-standing and cracked easily, but X-PEI-7 was highly flexible and remained intact even after folding (FIG. 6). As a benchmark, the properties of X-PEIs were compared against a state-of-art commercial PEI with a high $M_n$ of 19 kDa (Ultem 1010). Below $T_g$, X-PEI-7, X-PEI-8, and X-PEI-12 showed higher storage moduli than Ultem 1010, while XPEI-15 had a slightly lower storage modulus. Above $T_g$ but below 350° C., the storage moduli of XPEIs stayed at rubbery plateau values, characteristic of polymer crosslinking, whereas Ultem 1010 flowed at temperatures over ~250° C. and fully yielded at ~300° C. due to softening or melting (FIG. 7A). In addition, tan δ of X-PEIs at $T_g$ were lower than Ultem 1010 at $T_g$, an indication that the X-PEIs were more elastic. Thus, the different thermo-mechanical behaviors between X-PEIs and Ultem 1010 are attributed to the crosslinking reaction. The crosslinked X-PEIs had restricted chain motion, thus reduced damping and improved elasticity. Above 350° C., X-PEIs became stiff and the storage moduli increased from <10 MPa to >500 MPa. This stiffening behavior at elevated temperatures broadened the service temperature range of X-PEIs.

Figure 7C:
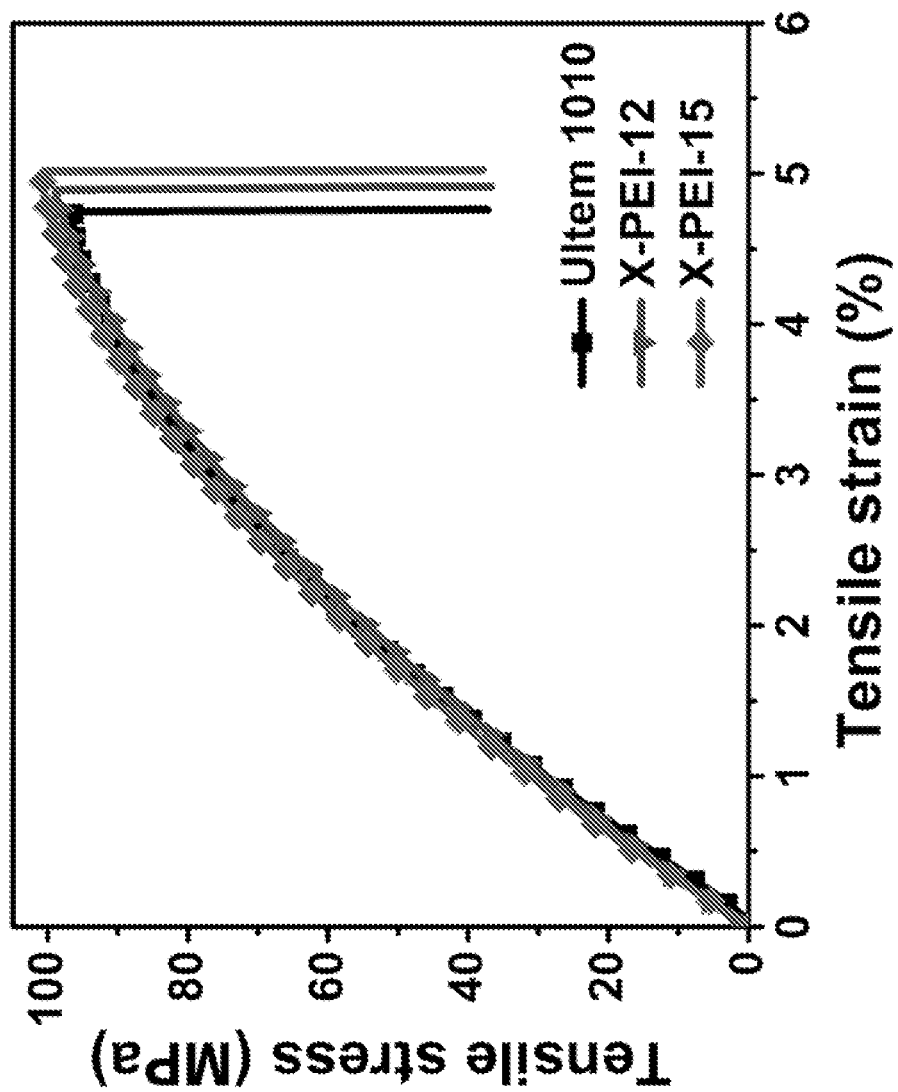
FIG. 7C shows tensile stress-strain curves of Ultem 1010, X-PEI-15, and X-PEI-12 measured at room temperature.
Figure 8:
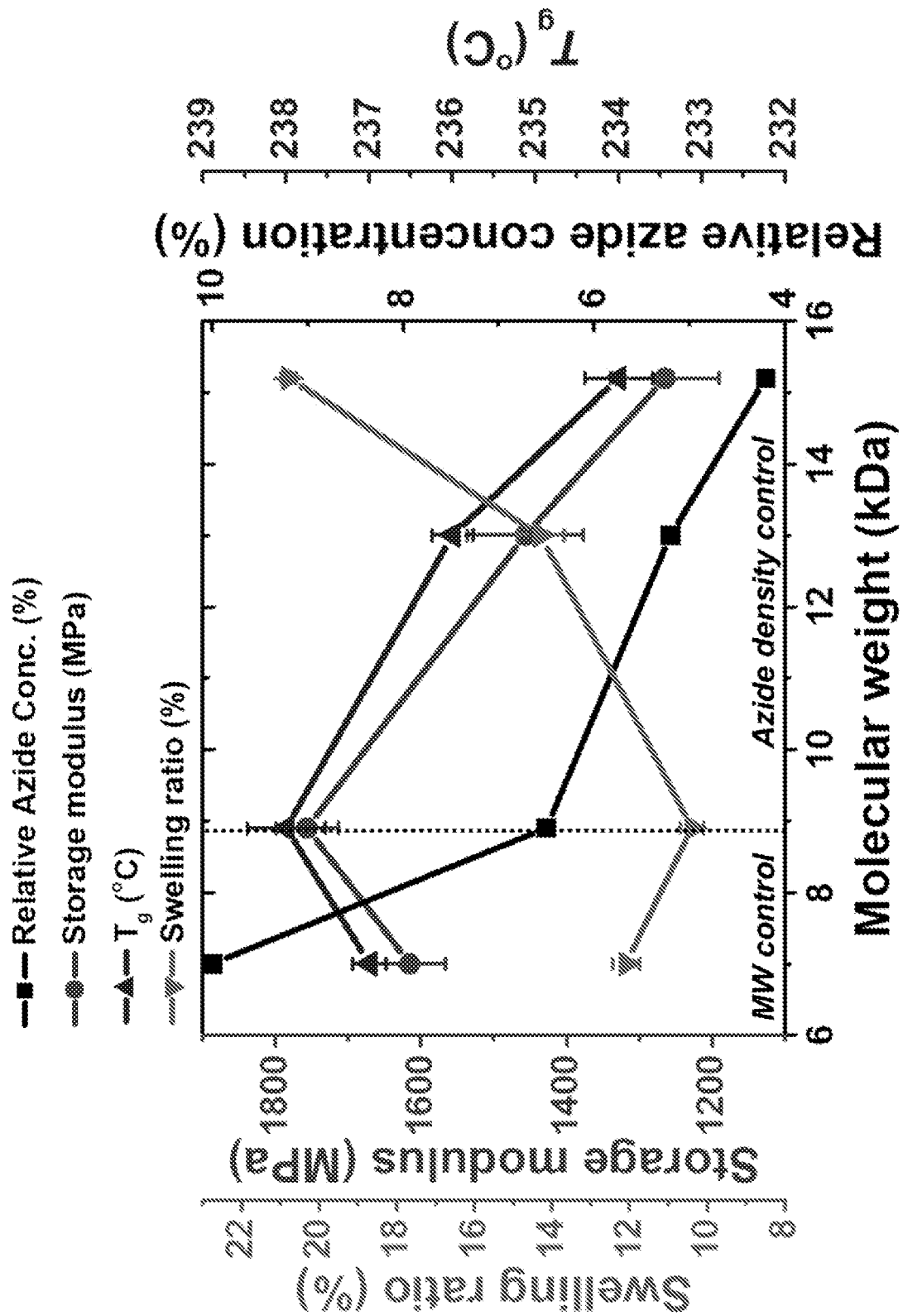
FIG. 8 shows dependencies of the storage modulus (measured at 100° C.), $T_g$, and swelling ratio (chloroform, 20° C., with an activity of 0.9) on crosslinking density for X-PEIs in chloroform.

Crosslinking density of X-PEIs can be calculated based on the storage modulus at equilibrium following a rubber theory. The storage moduli of X-PEIs changed little after the temperature reached 300° C. (FIG. 7A), and therefore this temperature was chosen as the equilibrium point for calculating the crosslinking density. The crosslinking density initially increased and then decreased with the molar mass of $N_3$-PEI-$N_3$, showing the highest crosslinking density of 0.177 kmol·m⁻³ for X-PEI-8 (Table 1 and FIG. 8). Both storage modulus and $T_g$ correlated positively with the crosslinking density (FIG. 8), in agreement with the phantom model in a recent report. Tensile tests were also performed for X-PEI-15 and X-PEI-12 (FIG. 7C). Both exhibited slightly improved tensile strength and Young's moduli than Ultem 1010 (FIG. 7C and Table 2).

TABLE 2

Stress-Strain Properties and Solvent Affinities of PEIs

| Designation | Tensile Stress (MPa)[a] | Tensile Strain (%)[a] | Young's Modulus (GPa)[a] | Solvent | $X_{ultem-solvent}$[b] |
|---|---|---|---|---|---|
| Ultem 1010 | 95.9 | 4.72 | 3.02 | DCM | 0.23 |
| X-PEI-12 | 98.8 | 4.90 | 3.26 | $CHCl_3$ | 0.52 |
| X-PEI-15 | 100.8 | 4.97 | 3.28 | THF | 0.64 |

[a]The mechanical properties were measured by an Instron at room environment, using a strain rate of 5 mm · min⁻¹.
[b]The Flory-Huggins parameter $X_{PEI-DCM}$ and $X_{PEI-chloroform}$ were calculated based on the Hansen solubility parameters in Equation (1)

$$\chi_{PEI-solvent} = \frac{V_m}{RT}\left[(\delta_{PEI,d} - \delta_{S,d})^2 + 0.25(\delta_{PEI,p} - \delta_{S,p})^2 + 0.25(\delta_{PEI,h} - \delta_{S,h})^2\right]$$

where the Flory-Huggins interaction parameter between PEI and a solvent, $X_{PEI\text{-}Solvent}$, was calculated based on Equation (1), where $V_m$ is the molar volume of the solvent; $\delta_{PEI,d}$, $\delta_{PEI,p}$, and $\delta_{PEI,h}$ are the dispersion, polarity, and hydrogen bonding components of Hansen solubility parameter of polyetherimide; $\delta_{S,d}$, $\delta_{S,p}$, and $\delta_{S,h}$ are the dispersion, polarity, and hydrogen bonding components of Hansen solubility parameters of the solvents. The related solubility parameters are listed in Table 3.

TABLE 3

Hansen Solubility Parameters and Total Solubility Parameters of PEI, DCM, Chloroform, and THF

| | $\delta_d$ (MPa$^{0.5}$) | $\delta_p$ (MPa$^{0.5}$) | $\delta_h$ (MPa$^{0.5}$) | $\Delta_{total}$ (MPa$^{0.5}$) |
|---|---|---|---|---|
| PEI | 21.1 | 7.4 | 7.1 | 23.5 |
| DCM | 18.2 | 6.3 | 6.1 | 20.2 |
| CHCl$_3$ | 17.8 | 3.1 | 5.7 | 18.9 |
| THF | 16.8 | 5.7 | 8.0 | 19.5 |

Figure 9A:
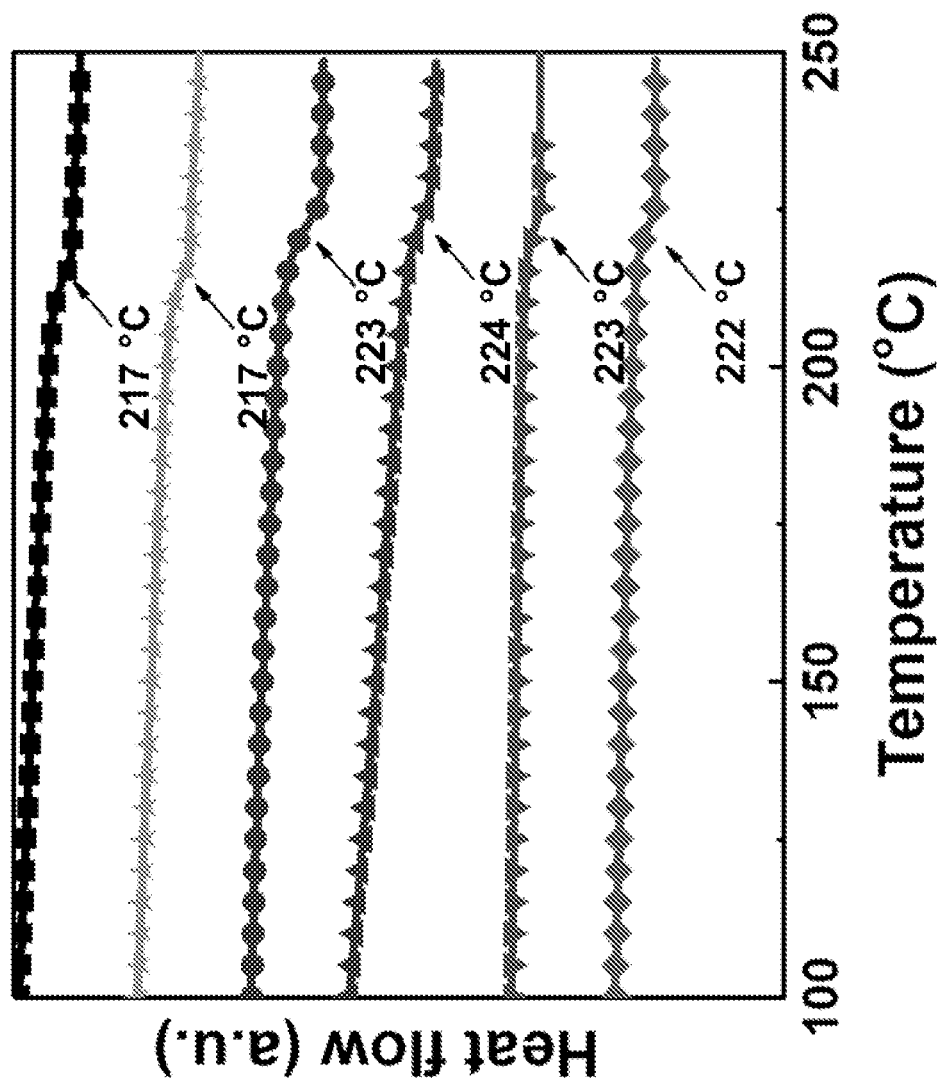
FIGS. 9A-9B show DSC and TGA traces of Ultem 1010, $NH_2$-PEI-$NH_2$, X-PEI-7, X-PEI-8, X-PEI-12, and X-PEI-15.

Results: Thermal Properties. DSC and TGA revealed the thermal properties of X-PEIs. All X-PEIs showed higher $T_g$ than Ultem 1010, indicating slightly improved thermal properties than the state-of-the-art PEI (Table 1 and FIGS. 9A-9B). The $T_g$s of X-PEIs correlated with the crosslinking density, which correlated negatively with molar mass of N$_3$-PEI-N$_3$ and positively with relative azide concentration (FIG. 3). The dominant factor was molar mass at <8 kDa but azide concentration at >8 kDa. Thus, $T_g$ increased from X-PEI-7 to X-PEI-8 and then dropped from X-PEI-8 to X-PEI-15 (Table 1, FIG. 3, and FIGS. 9A-B). Dominance of molar mass or relative azide concentration at different regions indicates that chain length played a key role in crosslinking density. Too short chains inhibited crosslinking reactions due to poor intermolecular interactions, but too long chains had insufficient crosslinking sites. For N$_3$-PEI-N$_3$, a moderate molecular weight of 8.9 kDa showed the optimal chain length for crosslinking (FIG. 3).

Figure 9B:
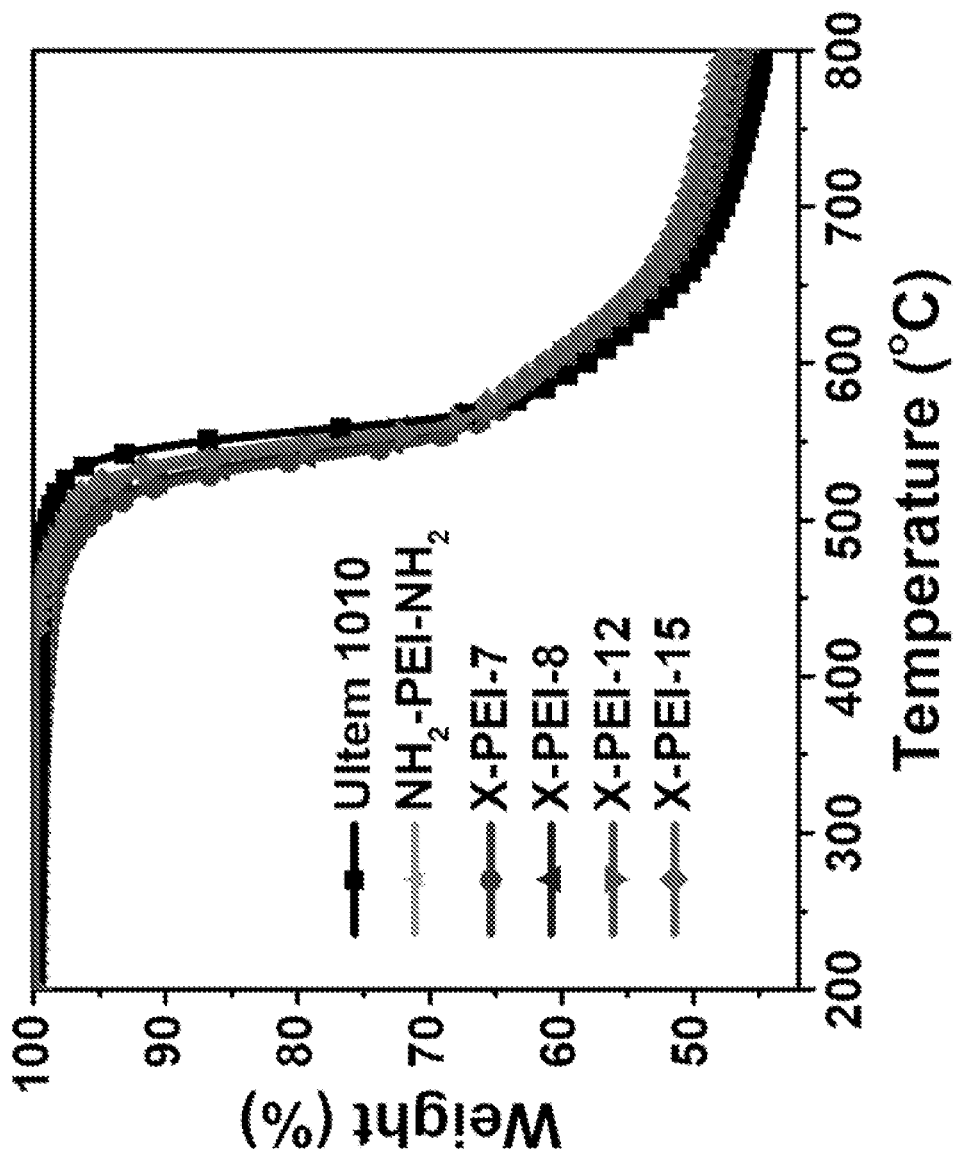
Figure 10:
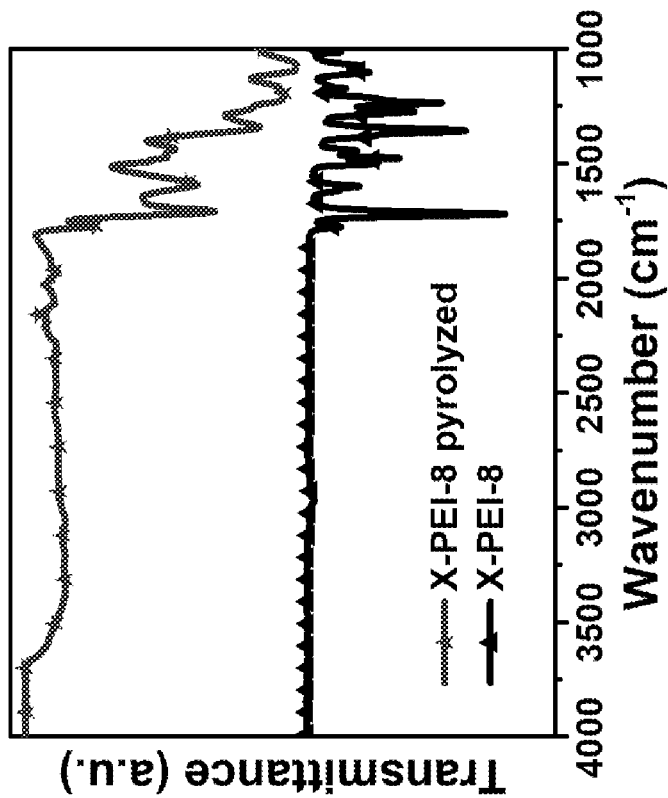
FIG. 10 shows (left) a partially oxidized and carbonized X-PEI-8 film after DMA test at 450° C. and (right) FTIR spectra of an X-PEI-8 film before (bottom spectrum) and after (top spectrum) DMA test at 450° C. The resolution of the FTIR was 8 cm$^{-1}$.
Figure 10:
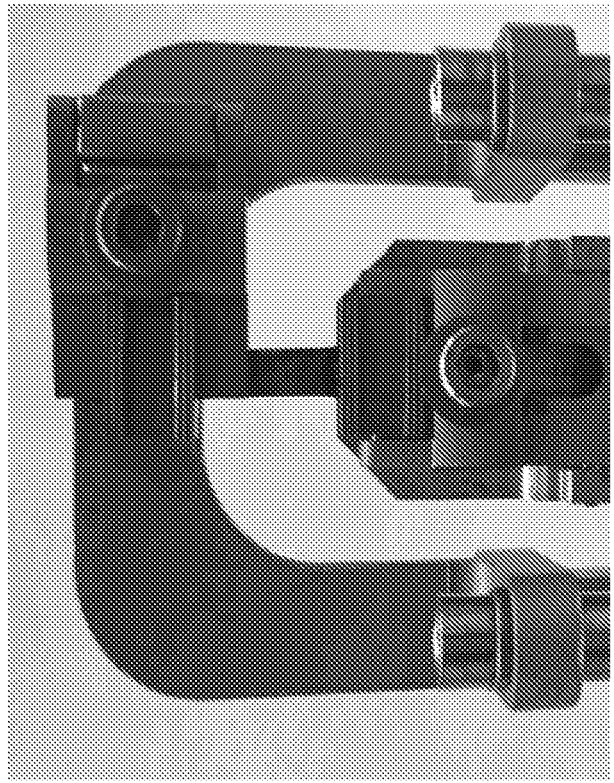

Thermal decomposition temperatures ($T_d$) of X-PEIs increased with the molar mass of N$_3$-PEI-N$_3$, but lower than that of Ultem 1010 (Table 1 and FIG. 9B). Typically, polymers show reduced Td after modifications, such as introduction of electron-rich CTC, less stable moieties, reversible crosslinkers, and asymmetric monomer. For X-PEIs, the reduced Td is mainly attributed to the less thermally stable amine linkages that usually decompose at ~300° C. However, it is important to note that the decomposition of amine linkages did not compromise the mechanical properties at high temperatures, because an oxidative crosslinking was initiated in the same temperature range (300-400° C.) to enhance the mechanical strength (FIG. 7A and FIG. 10).

Figure 11:
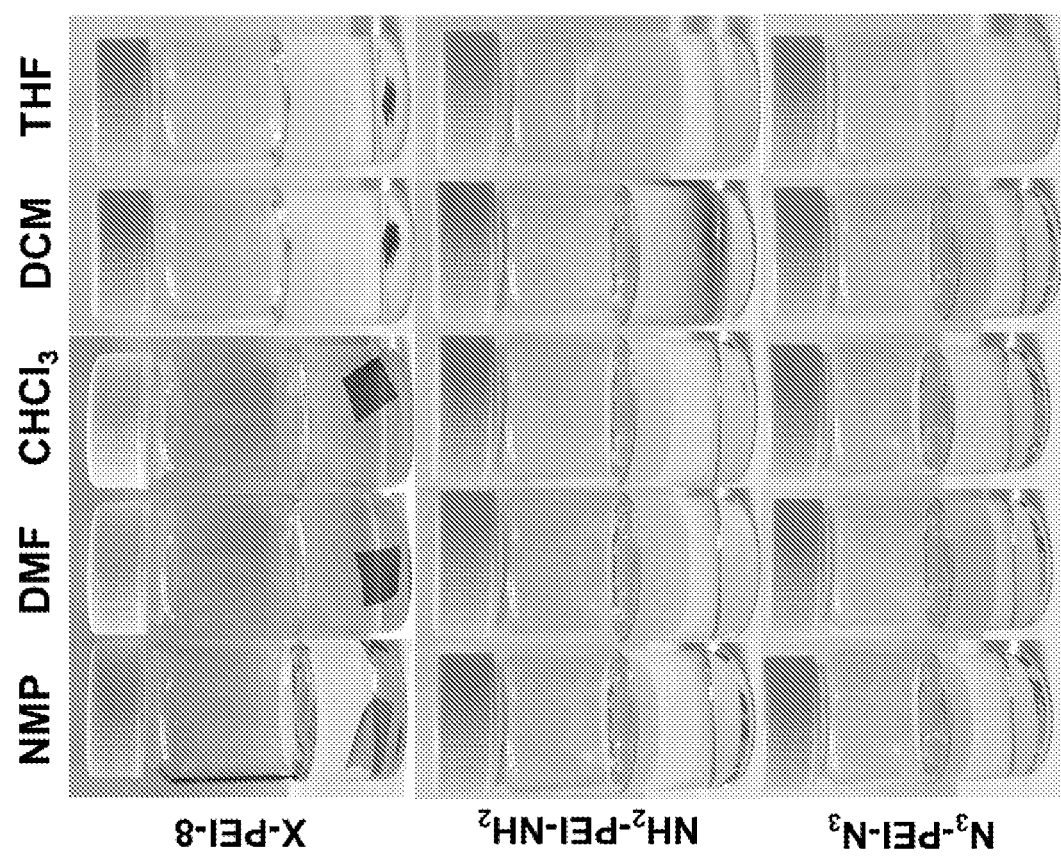
FIG. 11 shows solvent resistance of X-PEI-8 in NMP, DMF, chloroform, DCM, and THF. X-PEI-8 was resistant to all solvents, while the uncrosslinked $NH_2$-PEI-$NH_2$ and $N_3$-PEI-$N_3$ were soluble in NMP, DMF, chloroform, and DCM, and softened in THF.

Results: Solvent Resistance. The most remarkable feature of X-PEIs is their solvent resistance. Typically, chloroform, DCM, DMF, and NMP are well-known good solvents for PEIs (e.g., Ultem and other uncrosslinked PEIs). For example, in an immersion test, all uncrosslinked NH$_2$-PEI-NH$_2$ and N$_3$-PEI-N$_3$ were easily dissolved in these solvents. However, after crosslinking, X-PEIs were intact after long-time immersion (FIG. 11). To provide a harsher environment, DMF and NMP were heated at 150° C. for 1 h, but X-PEI remained undissolved. THF is a poor solvent but good plasticizer for PEI. Similarly, X-PEI was resistant to plasticization and kept the original shape after immersion.

Figure 12:
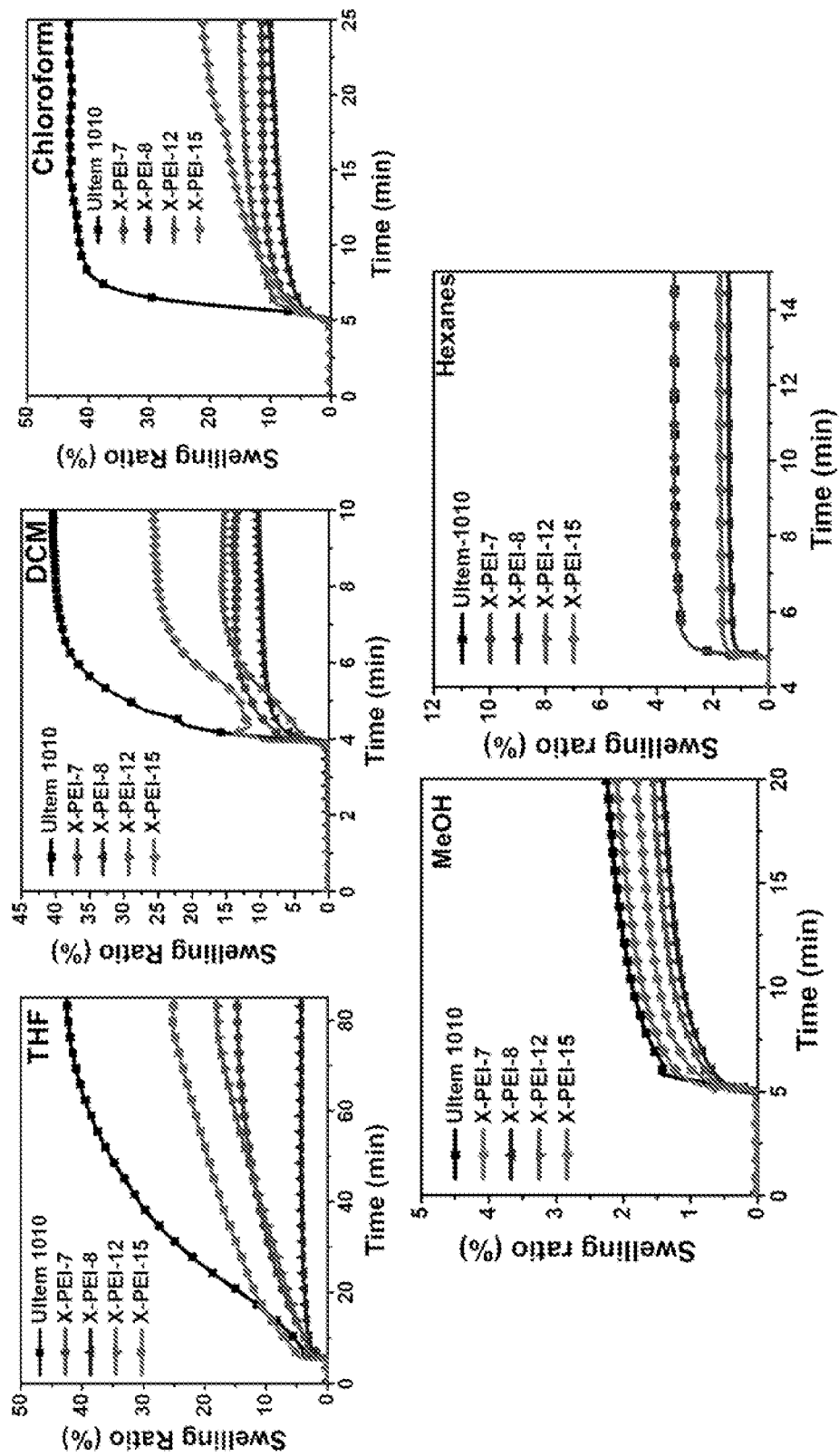
FIG. 12 shows QCMD vapor adsorption tests of THF, DCM, chloroform, hexanes, and methanol on various PEIs at 20° C. The activities for all solvents were ~0.9.

To quantify the solvent resistance, X-PEIs and Ultem 1010 were exposed to DCM, chloroform, THF, methanol, and hexanes to measure vapor uptake using QCM-D (FIG. 12). The utilization of QCM-D avoided solvent evaporation of organic solvents or moisture sorption in a typical immersion test, which provides more precise results. Ultem 1010 showed the highest swelling ratio of ~40% in DCM, chloroform, and THF (Table 1). The sorption kinetics differed drastically, and the sorption time ranged from ~5 min in DCM and chloroform to ~70 min in THF (Table 3 and FIG. 12), due to a) different affinities (or $\chi$ values) of PEI to these solvents and b) different diffusivities of these solvents in PEI. In a mutual diffusion system of small solvent molecules and polymer films, a small $\chi$ values come with a large coefficient of mutual diffusion. The good polymer-solvent affinity (small $\chi$ value) allows for adsorption of solvent molecules on the polymer chains, as well as fast diffusion of solvent molecules into the polymer films (e.g., the sorption of DCM and Chloroform on PEI). As the $\chi$ value increases, although sorption still occurs, the small diffusion coefficient retards the system to reach equilibrium (e.g., the sorption of THF on PEI). When the polymer-solvent affinity is so poor that solvent is regarded as a non-solvent, stable sorption nor diffusion of solvent molecules barely occur in the polymer film. As the result, the polymer film reaches equilibrium quickly (e.g., the sorption of MeOH and hexanes). The swelling ratios of X-PEIs, however, were significantly lower and correlated negatively with crosslinking density. With the highest crosslinking density, X-PEI-8 had the lowest swelling ratios of 11.2%, 10.4%, and 4.0% in DCM, chloroform, and THF, respectively, less than half the swelling ratio of Ultem 1010. As the crosslinking density was decreased, the swelling ratios increased but remained below 26% in all tested solvents.

Figures 13A, 13B, 13C:
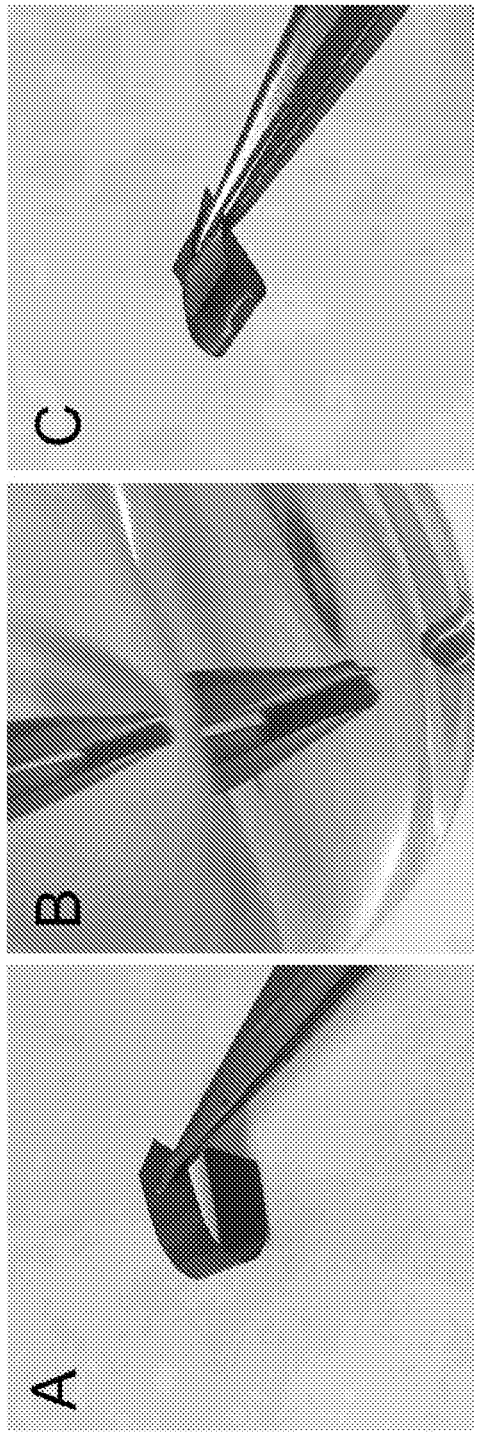
FIGS. 13A-13C show a bending test of an X-PEI-8 film (FIG. 13A) in a dry state, (FIG. 13B) immersed in $CHCl_3$ and saturated by the solvent, and (FIG. 13C) saturated by $CHCl_3$ but out of the solvent.
Figure 14:
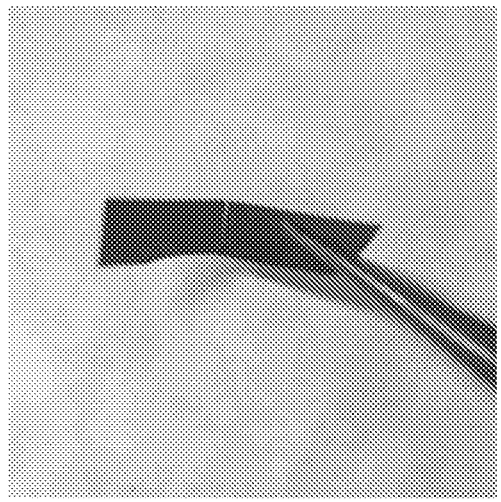
FIG. 14 shows a photographic image of a folded X-PEI-8 film saturated by $CHCl_3$ with a crack near the folding line.

To examine the potential of using X-PEI in solvent-rich environment, bending tests were performed on a dry film (FIG. 13A) and chloroform-saturated films (FIGS. 13B-13C). Upon bending, the dry X-PEI-8 film was flexible and intact. The film was then immersed in CHCl$_3$ for 1 h. To avoid solvent evaporation from the X-PEI-8 film, the solvent-saturated film was bent in CHCl$_3$ (FIG. 13B), and it remained intact. Afterwards, the film was taken out of the solvent and bent again in air (FIG. 13C). The X-PEI-8 film showed no visible damage after bending. Therefore, X-PEI possessed good mechanical stability when saturated by a strong swelling solvent, despite the high strain exerted upon the crosslinked polymer network. Although the solvent-saturated X-PEI-8 survived the bending test, it showed reduced foldability. Dry X-PEI-8 films can be folded without noticeable damage (FIG. 6), but the solvent-saturated X-PEI-8 film did not survive the folding test (FIG. 14). Due to swelling-induced tension, the maximum amount of strain that X-PEI-8 can tolerate has been compromised.

Example 5: Relative Azide Concentration and Crosslinking Density

Relative azide concentration of N3-PEI-N3 was determined by FTIR using the transmittance value of azide stretching. The crosslinking density (v) and average molar mass between crosslinks (Mc) were estimated based on the equilibrium elastic modulus using equation (2):

$$G' = \frac{E'}{2(1 + \sigma)} = RT\frac{\rho}{M_c} = RTv$$

where G' is shear modulus at equilibrium, E' is tensile modulus at equilibrium, σ is the Poisson ratio, and ρ is the mass density of the network. The Poisson ratio (σσ=0.36) of X-PEIs and Ultem 1010 was estimated to be similar, which is a standard value of Ultem. Because E' equals the modulus at rubbery plateau region, it was measured by DMA in a temperature-scan mode.

Example 6: Quartz Crystal Microbalance with Dissipation (QCM-D) Measurements Solvent resistance of Ultem 1010 and X-PEI films were investigated by using QCM-D (Q-Sense E4, Biolin Scientific AB) vapor sorption test. The QCM-D sensors were spin-coated with 0.1 wt % $N_3$-PEI-$N_3$ solutions in chloroform and then thermally treated in a vacuum oven at 230° C. for 24 h. Gas uptake was measured with controlled activity (a~0.9) for different solvents. The activity was controlled by setting the temperature of the gas saturator cell at 18.5° C. and the QCM-D sensors at 20° C. The activity was calculated according to Equation (3):

$$a = \frac{P_1}{P_1^*}$$

where $P_1$ is the vapor pressure of the organic solvent at the temperature of gas saturator cell and $P_1^*$ is the vapor pressure of the organic solvent at the temperature of QCM-D sensors. Ultem 1010 and X-PEIs coated sensors were placed in the QCM-D flow cells flushed by targeting vapor carried by $N_2$, where changes in frequency ($\Delta f$) and dissipation ($\Delta D$) of polymer-coated quartz crystals were monitored simultaneously. Vapor exposure continued until the gas sorption reached equilibrium. The swelling ratios (α) of PEI films in different solvents were calculated based upon Equation (4):

$$\alpha = \frac{m_s}{m_p} = \frac{\Delta f_s}{\Delta f_p}$$

where $m_s$ and $m_p$ are the masses of the solvent gas and pure polymer films, respectively; $\Delta f_s$ is the change in frequency due to the gas uptake; and $\Delta f_p$ is the change in frequency due to the loading of PEI films. Note that mass ratios were converted to frequency ratios according to Sauerbrey relationship: the changes in mass on the quartz surface are proportional to changes in frequency of the oscillating crystal.

Example 7: Conclusion

In conclusion, X-PEIs were prepared from $N_3$-PEI-$N_3$ via thermal crosslinking. Despite the much lower prepolymer molar mass, X-PEIs possessed improved $T_g$ and storage moduli (except for XPEI-15) compared with high-molecular-weight Ultem 1010. Impressively, X-PEIs exhibited exceptional solvent-resistance to typical solvents of PEI including NMP, DMF, chloroform, and DCM, making them insoluble in any solvent tested. Among all tested molar mass, $N_3$-PEI-$N_3$-8 afforded the highest crosslinking density and thus X-PEI-8 showed the highest $T_g$, storage modulus, and solvent resistance. The properties deteriorated as the molar mass changed because of the competing effects between $N_3$-PEI-$N_3$ molecular weight and relative azide concentration. This report presents a simple and efficient approach to modulating the thermal, mechanical, and solvent-resistant properties of polyetherimide. It highlights a hallmark of the first solvent-resistant and yet processing-friendly PEI prepared from oligomers. The findings provide a solution to circumventing the problem of high processing temperatures for other high-performance polymers such as PEEK and PI. The method is applicable to porous polymers and can find use in battery separators, fuel cell membranes, filtration, and gas separation membranes.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES

1. Bai, Y.; et al, A new approach to highly electrooptically active materials using cross-linkable, hyperbranched chromophore-containing oligomers as a macromolecular dopant. J. Am. Chem. Soc. 2005, 127, 2060-2061.
2. Budy, S. M.; et al, Polyarylene polyimides with hydrocarbon and semifluorinated backbones: synthesis, characterization, and properties. Polym. Chem. 2020, 11, 6273-6280.
3. Burdzinski, G.; et al, Early events in the photochemistry of aryl azides from femtosecond UV/Vis spectroscopy and quantum chemical calculations. J. Am. Chem. Soc. 2006, 128, 13402-13411.
4. Cao, K.; et al, Facile Preparation of Halogen-Free Poly (ether imide) Containing Phosphonium and Sulfonate Groups. ACS Appl. Polym. Mater. 2019, 2, 66-73.
5. Cao, K.; et al, Impact of metal cations on the thermal, mechanical, and rheological properties of telechelic sulfonated polyetherimides. Polym. Chem. 2020, 11, 393-400.
6. Cao, K.; et al, Low-Molecular-Weight, High-Mechanical-Strength, and Solution-Processable Telechelic Poly(ether imide) End-Capped with Ureidopyrimidinone. Macromolecules 2017, 50, 2016-2023.
7. Cao, K.; et al, Mechanically Strong, Thermally Stable, and Flame Retardant Poly(ether imide) Terminated with Phosphonium Bromide. Macromolecules 2019, 52, 7361-7368.
8. Cao, K.; et al, Melt-processable telechelic poly(ether imide)s end-capped with zinc sulfonate salts. Polym. Chem. 2018, 9, 5660-5670.
9. Cao, K.; et al, The Effect of End Group and Molecular Weight on the Yellowness of Polyetherimide. Macromol. Rapid Commun. 2018, 39, 1800045.
10. Cella, J. A., Degradation and stability of polyimides. Polym. Degrad. Stab. 1992, 36, 99-110.
11. Fingas, M.; et al, Solidifier effectiveness: Variation due to oil composition, oil thickness and temperature. Proceedings of the 32.AMOP technical seminar on environmental contamination and response, Vancouver, BC, Canada, Jun. 9-11, 2009.
12. Fink, J. K., Poly(imide)s, In High Perform. Polym., William Andrew Publishing: Norwich, N Y, 2014; p 353.
13. Gao, C.; et al, Scalable Functional Group Engineering of Carbon Nanotubes by Improved One-Step Nitrene Chemistry. Chem. Mater. 2009, 21, 360-370.

14. Gao, X.; et al, High performance cross-linked anion exchange membrane based on aryl-ether free polymer backbones for anion exchange membrane fuel cell application. Sustain. Energy Fuels 2020, 4, 4057-4066.
15. Ge, J. J.; et al, Multiwalled carbon nanotubes with chemically grafted polyetherimides. J. Am. Chem. Soc. 2005, 127, 9984-9985.
16. Grissom, T. G.; et al, Interaction parameters for the uptake of sulfur mustard mimics into polyurethane films. Prog. Org. Coat. 2017, 107, 14-17.
17. Han, S. S.; et al, Synthesis and characterization of new polyimides containing ethynylene linkages. Eur. Polym. J. 2007, 43, 1541-1548.
18. Hansen, C. M. Hansen Solubility Parameters, $4^{th}$ ed., 2007, CRC Press: Boca Raton, FL, USA.
19. He, X.; et al, Solvent resistant nanofiltration membranes using EDA-XDA co-crosslinked poly(ether imide). Sep. Purif. Technol. 2018, 206, 247-255.
20. Herrmann-Schönherr, O.; et al, Chain dimensions, entanglement molecular weights and molecular weight distributions of poly(aryl ethers). A combined rheological and MNDO analysis. Macromol. Chem. Phys 1992, 193, 1955-1974.
21. Huang, D.; et al, Recent Advances in Reactions of Azides. Adv. Synth. Catal. 2017, 359, 1600-1619.
22. Kim, D.; et al, Swelling and mechanical properties of superporous hydrogels of poly(acrylamide-co-acrylic acid)/polyethylenimine interpenetrating polymer networks. Polymer 2004, 45, 189-196.
23. Kim, K.; et al, Effects of Dianhydrides on the Thermal Behavior of Linear and Crosslinked Polyimides. J. Appl. Polym. Sci. 2015, 132, 41412.
24. Kratochvil, A. M.; et al, Decarboxylation-Induced Cross-Linking of a Polyimide for Enhanced CO2Plasticization Resistance. Macromolecules 2008, 41, 7920-7927.
25. L'Abbe, G., Decomposition and addition reactions of organic azides. Chem. Rev. 1969, 69, 345-363.
26. Leyva, E.; et al, High yields of formal CH insertion products in the reactions of polyfluorinated aromatic nitrenes. J. Am. Chem. Soc. 1986, 108, 8307-8309.
27. Li, G.; et al, Room-temperature RAFT copolymerization of 2-chloroallyl azide with methyl acrylate and versatile applications of the azide copolymers. J. Polym. Sci., Part A: Polym. Chem. 2010, 48, 1348-1356.
28. Li, X. M.; et al, Amphiphobic polyHIPEs with pH-triggered transition to hydrophilicity-oleophobicity for the controlled removal of water from oil-water mixtures. Polym. Chem. 2020, 11, 6935-6943.
29. Li, Y. Z.; et al, 1,2-Didehydroazepines from the photolysis of substituted aryl azides: analysis of their chemical and physical properties by time-resolved spectroscopic methods. J. Am. Chem. Soc. 1988, 110, 8092-8098.
30. Liu, T.; et al, Porous organic materials offer vast future opportunities. Nat Commun 2020, 11, 4984.
31. Liu, Y.; et al, Effect of crosslinking distribution on gas permeability and permselectivity of crosslinked polyimides. Eur. Polym. J. 1999, 35, 1739-1741.
32. Liu, Y.; et al, Gas permeability and permselectivity of photochemically crosslinked copolyimides. J. Appl. Polym. Sci. 1999, 73, 521-526.
33. Lu, Y. X.; et al, Making insoluble polymer networks malleable via olefin metathesis. J. Am. Chem. Soc. 2012, 134, 8424-8427.
34. Meimoun, J.; et al, Lipase-catalysed polycondensation of levulinic acid derived diol-diamide monomers: access to new poly(ester-co-amide)s. Polym. Chem. 2020, 11, 7506-7514.
35. Mushtaq, N.; et al, Synthesis and crosslinking study of isomeric poly(thioether ether imide)s containing pendant nitrile and terminal phthalonitrile groups. Polym. Chem. 2016, 7, 7427-7435.
36. Ortega, A. M.; et al, Structure-property relationships in photopolymerizable polymer networks: Effect of composition on the crosslinked structure and resulting thermomechanical properties of a (meth)acrylate-based system. J. Appl. Polym. Sci. 2008, 110, 1559-1572.
37. Pandurangi, R. S.; et al, Chemistry of Bifunctional Photoprobes. 1. Perfluoroaryl Azido Functionalized Phosphorus Hydrazides as Novel Photoreactive Heterobifunctional Chelating Agents: High Efficiency Nitrene Insertion on Model Solvents and Proteins. J. Org. Chem. 1997, 62, 2798-2807.
38. Pater, R. H.; et al, Crosslinking-property relationships in PMR polyimide composites. Part I. Polym. Compos. 1991, 12, 126-132.
39. Penning, J. P.; et al, High performance thermoplastic compositions with improved melt flow behavior. U.S. Pat. No. 6,417,255 B1, 2002.
40. Powell, C. E.; et al, Reversible diamine cross-linking of polyimide membranes. J. Membr. Sci. 2007, 291, 199-209.
41. Reviakine, I.; et al, Hearing what you cannot see and visualizing what you hear: interpreting quartz crystal microbalance data from solvated interfaces. Anal. Chem. 2011, 83, 8838-8848.
42. Rosu, L.; et al, Modification of the surface properties of a polyimide film during irradiation with polychromic light. Appl. Surf. Sci. 2011, 257, 6996-7002.
43. Searle, O. B.; et al, Victrex® poly(ethersulfone) (PES) and Victrex® poly(etheretherketone) (PEEK). Polym. Eng. Sci. 1985, 25, 474-476.
44. Shen, J.; et al, Effects of Cross-Link Density and Distribution on Static and Dynamic Properties of Chemically Cross-Linked Polymers. Macromolecules 2018, 52, 121-134.
45. Stokes-Griffin, C. M.; et al, The effect of processing temperature and placement rate on the short beam strength of carbon fibre-PEEK manufactured using a laser tape placement process. Compos. Part A Appl. Sci. Manuf. 2015, 78, 274-283.
46. Tan, M. et al., Calculation on phase diagrams of polyetherimide/N,N-dimethylacetamide/H2O -BuOH casting system and their relevance to membrane performances, Front. Chem. Sci. Eng., 2014, 8, 312-319.
47. Taranekar, P.; et al, Investigating carbazole jacketed precursor dendrimers: sonochemical synthesis, characterization, and electrochemical crosslinking properties. J. Am. Chem. Soc. 2007, 129, 12537-12548.

48. Tobolsky, A. V.; et al, Rubber elasticity and chain configuration. J. Polym. Sci. 1961, 54, 175-192.
49. Vanherck, K.; et al, Crosslinking polyimides for membrane applications: A review. Prog. Polym. Sci. 2013, 38, 874-896.
50. Weber, T.; et al, 2-(Tributylstannyl)-4-[3-(trifluoromethyl)-3H-diazirin-3-yl]benzyl Alcohol: A Building Block for Photolabeling and Crosslinking Reagents of Very High Specific Radioactivity. J. Am. Chem. Soc. 1995, 117, 3084-3095.
51. Wu, J.; et al, Reducing the thickness of solid-state electrolyte membranes for high-energy lithium batteries. Energy Environ. Sci. 2021, 14, 12-36.
52. Xia, Y.; et al, Well-defined liquid crystal gels from telechelic polymers. J. Am. Chem. Soc. 2008, 130, 1735-1740.
53. Xu, X.; et al, An unexpected diethyl azodicarboxylate-promoted dehydrogenation of tertiaryamine and tandem reaction with sulfonyl azide. J. Am. Chem. Soc. 2008, 130, 14048-14049.
54. Xu, Z.; et al, Thermally Stable and Mechanically Strong Mesoporous Films of Poly(ether imide)-Based Triblock Copolymers. ACS Appl. Polym. Mater. 2020, 2, 1398-1405.
55. Yi, L.; et al, Polyimides with side groups: Synthesis and effects of side groups on their properties. J. Polym. Sci., Part A: Polym. Chem. 2017, 55, 533-559.
Zhang, Y.; et al, Molecular design, synthesis and characterization of intrinsically black polyimide films with high thermal stability and good electrical properties. J. Polym. Res. 2019, 26, 171-180.

What is claimed is:

1. A method for making a crosslinked poly(ether imide) polymeric film, the method comprising:
   (a) casting an azide-containing poly(ether imide) polymer into a film; and
   (b) heating the polymer film to a crosslinking temperature to crosslink the polymer;
   wherein the azide-containing poly(ether imide) polymer has a structure of Formula I:

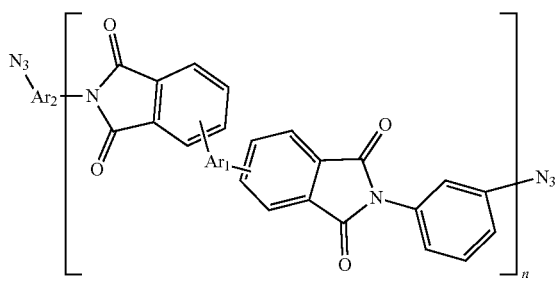

Formula I wherein n is from 5 to 100; and
wherein $Ar_1$ and $Ar_2$ independently comprise substituted or unsubstituted aromatic or diaromatic groups.

2. The method of claim 1, wherein the azide-containing poly(ether imide) polymer is cast from a solution or a melt.

3. The method of claim 1, wherein the azide-containing poly(ether imide) polymer is dissolved in a solvent prior to casting from a solution, wherein the solvent comprises dichloromethane, trichloromethane, bromomethane, N,N-dimethylformamide, dimethylacetamide, N-methyl-2-pyrrolidone, dimethyl sulfoxide, chlorobenzenes, water, methanol, ethanol, acetic acid, or any combination thereof.

4. The method of claim 1, wherein heating the polymer further comprises annealing, exposure to radiation, or both annealing and exposure to radiation.

5. The method of claim 1, wherein the crosslinking temperature is from about 150 to about 300° C.

6. The method of claim 1, wherein $Ar_1$ is selected from

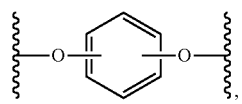

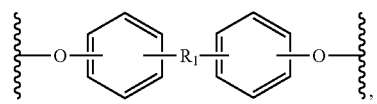

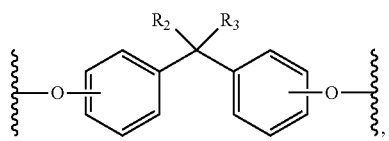

or any combination thereof;

wherein $R_1$ is selected from phenylene, O, C(=O)O, S(=O)$_2$, C(=O)O$_2$, C(=O), or any combination thereof;

wherein $R_2$ and $R_3$ are independently selected from trifluoromethyl, trichloromethyl, tribromomethyl, hydroxyl, thiol, fluoro, chloro, bromo, hydrogen, $C_1$-$C_5$ alkyl, or any combination thereof.

7. The method of claim 1, wherein $Ar_2$ is selected from

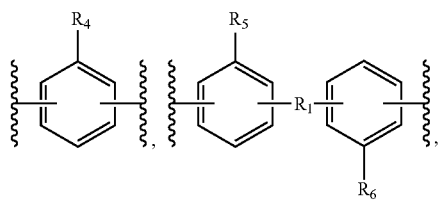

or any combination thereof;

wherein $R_1$ is selected from phenylene, O, C(=O)O, S(=O)$_2$, C(=O)O$_2$, C(=O), or any combination thereof;

wherein $R_4$, $R_5$, and $R_6$ are independently selected from hydrogen, nitro, fluoro, chloro, bromo, $C_yH_{2y+1}$, or any combination thereof; and wherein y is from 1 to 5.

8. The method of claim 1, wherein the azide-containing poly(ether imide) polymer has a structure of Formula II:

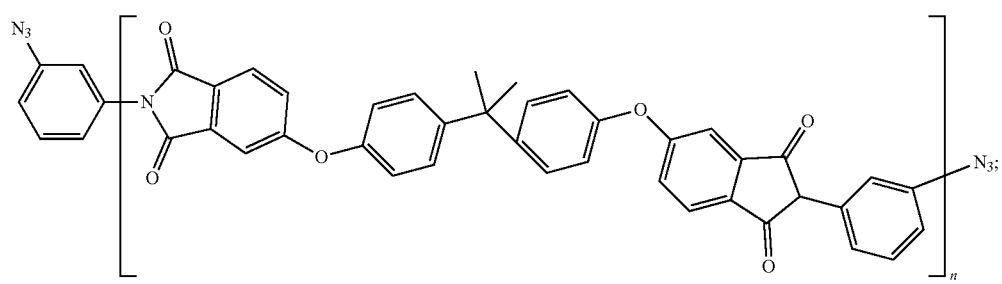

wherein n is from about 5 to about 90.

9. The method of claim 1, wherein the azide-containing poly(ether imide) polymer in step (a) has a molecular weight of from about 2 to about 50 kDa.

10. A crosslinked polymeric film produced by the method of claim 1, wherein the crosslinked polymeric film has a crosslinking density of from about 0.09 to about 0.18 kmol/m$^3$.

11. The crosslinked polymeric film of claim 10, wherein the crosslinked polymeric film does not reversibly decrosslink at elevated temperatures.

12. The crosslinked polymeric film of claim 10, wherein the crosslinked polymeric film is resistant to dissolution in at least one solvent, wherein the at least one solvent comprises dichloromethane, trichloromethane, bromomethane, N, N-dimethylformamide, dimethylacetamide, N-Methyl-2-pyrrolidone, dimethyl sulfoxide, chlorobenzenes, water, methanol, ethanol, acetic acid, or any combination thereof.

13. An article comprising the crosslinked polymeric film of claim 10.

14. The article of claim 13, wherein the article comprises a coating, film, filtration membrane, battery separator, fuel cell membrane, gas separation membrane, or any combination thereof.

15. A crosslinked polymeric film comprising a plurality of polymeric units of Formula III:

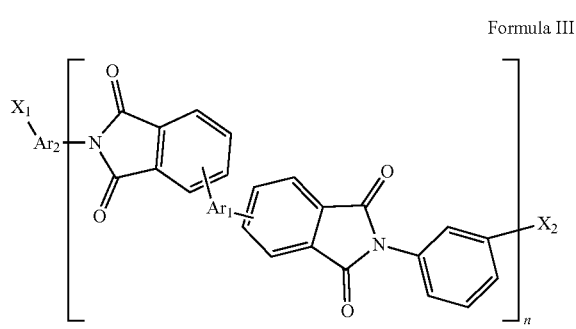

wherein n represents a number of monomeric units in each polymeric unit;
wherein n is from 5 to 100;
wherein Ar$_2$ comprises substituted or unsubstituted aromatic or diaromatic groups;

wherein Ar$_1$ is selected from

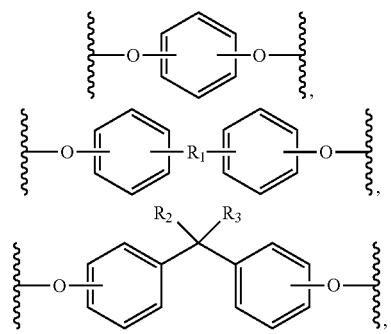

or any combination thereof;
wherein R$_1$ is selected from phenylene, O, C(=O)O, S(=O)$_2$, C(=O)O$_2$, C(=O), or any combination thereof,
wherein R$_2$ and R$_3$ are independently selected from trifluoromethyl, trichloromethyl, tribromomethyl, hydroxyl, thiol, fluoro, chloro, bromo, hydrogen, C$_1$-C$_5$ alkyl, or any combination thereof; and
wherein at least one implicit hydrogen of at least one monomeric unit of each polymeric unit of the plurality comprises an amine linkage to at least one of X$_1$ or X$_2$ of at least one other polymeric unit of the plurality.

16. The crosslinked polymeric film of claim 15, wherein Ar$_2$ is selected from

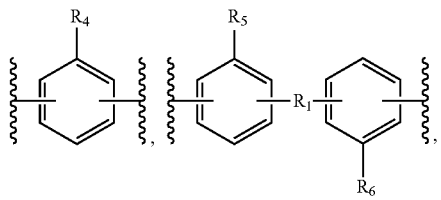

or any combination thereof;
wherein R$_1$ is selected from phenylene, O, C(=O)O, S(=O)$_2$, C(=O)O$_2$, C(=O), or any combination thereof;
wherein R$_4$, R$_5$, and R$_6$ are independently selected from hydrogen, nitro, fluoro, chloro, bromo, C$_y$H$_{2y+1}$, or any combination thereof; and
wherein y is from 1 to 5.

17. The crosslinked polymeric film of claim 15, wherein the film comprises a plurality of polymeric units of Formula IV:

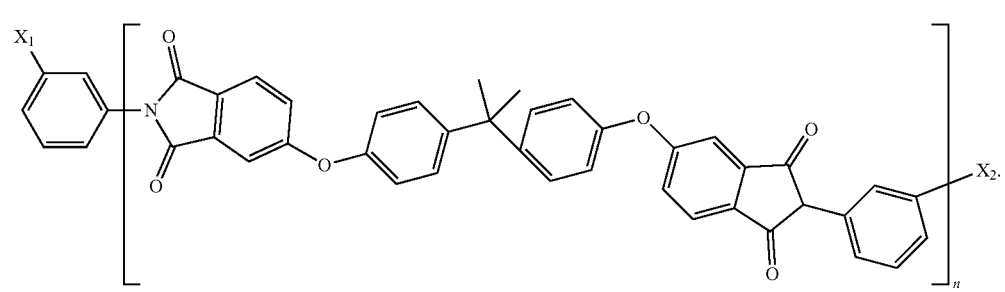
Formula IV
* * * * *